United States Patent
Krzyzanowski et al.

(10) Patent No.: US 7,024,256 B2
(45) Date of Patent: Apr. 4, 2006

(54) METHOD, SYSTEM, AND COMPUTER PROGRAM PRODUCT FOR AUTOMATICALLY MANAGING COMPONENTS WITHIN A CONTROLLED ENVIRONMENT

(75) Inventors: Paul Krzyzanowski, Fanwood, NJ (US); Michael Kelly, Deerfield Beach, FL (US)

(73) Assignee: OpenPeak Inc., Boca Raton, FL (US)

( * ) Notice: Subject to any disclaimer, the term of this patent is extended or adjusted under 35 U.S.C. 154(b) by 24 days.

(21) Appl. No.: 10/782,923

(22) Filed: Feb. 23, 2004

(65) Prior Publication Data

US 2004/0163073 A1    Aug. 19, 2004

Related U.S. Application Data

(63) Continuation-in-part of application No. 10/382,897, filed on Mar. 7, 2003, now Pat. No. 6,792,323, which is a continuation-in-part of application No. 10/180,500, filed on Jun. 27, 2002.

(60) Provisional application No. 60/533,220, filed on Dec. 31, 2003.

(51) Int. Cl.
*G05B 19/00* (2006.01)
*G06F 17/00* (2006.01)

(52) U.S. Cl. .......................................... 700/65; 700/90
(58) Field of Classification Search ........ 709/201–203, 709/223–229, 250; 700/90, 65; 707/10; 307/38–40; 455/3.03–3.06; 718/1, 100

See application file for complete search history.

(56) References Cited

U.S. PATENT DOCUMENTS

| | | |
|---|---|---|
| 5,414,426 A | 5/1995 | O'Donnell et al. |
| 5,519,878 A | 5/1996 | Dolin, Jr. |
| 5,537,463 A | 7/1996 | Escobosa et al. |
| 5,552,917 A | 9/1996 | Darbee et al. |
| 5,570,085 A | 10/1996 | Bertsch |

(Continued)

OTHER PUBLICATIONS

*Total Remote Software: Griffin Technology Downloads*, 1 page, printed from Internet- URL—http://www.griffintechnology.com/software/software_totalremote.html, (printed Feb. 23, 2004).

(Continued)

*Primary Examiner*—Maria N. Von Buhr
(74) *Attorney, Agent, or Firm*—Sterne, Kessler, Goldstein & Fox, P.L.L.C.

(57) ABSTRACT

A control server, or similar central processor, manages the distribution of data (including audio and video), voice, and control signals among a plurality of system components (such as, televisions, monitors, PDAs, portable stereo, lighting, ovens, alarm clocks, etc.) connected via a wired and/or wireless communications network. A portable controller allows a user to access and control the system components from any location within a controlled residential and/or non-residential environment, including its surrounding areas. One or more control macros can be established to control the operations and/or functions of the system components. A control macro includes commands for enabling the control server to control the system components. The control macro can be manually activated by a user, or automatically executed upon the occurrence of a commencement parameter. The control macro can also be automatically particularized for application in a specific context.

28 Claims, 13 Drawing Sheets

U.S. PATENT DOCUMENTS

| | | | |
|---|---|---|---|
| 5,689,353 A | 11/1997 | Darbee et al. | |
| 5,771,388 A * | 6/1998 | Mondrik et al. | 710/262 |
| 5,802,467 A | 9/1998 | Salazar et al. | |
| 5,805,812 A | 9/1998 | Fish et al. | |
| 5,875,108 A | 2/1999 | Hoffberg et al. | |
| 5,898,386 A | 4/1999 | Kaihatsu | |
| 5,926,108 A | 7/1999 | Wicks et al. | |
| 5,930,699 A | 7/1999 | Bhatia | |
| 5,953,144 A | 9/1999 | Darbee et al. | |
| 5,956,025 A | 9/1999 | Goulden et al. | |
| 5,956,487 A | 9/1999 | Venkatraman et al. | |
| 5,959,751 A | 9/1999 | Darbee et al. | |
| 5,963,624 A | 10/1999 | Pope | |
| 6,005,861 A | 12/1999 | Humpleman | |
| 6,026,150 A | 2/2000 | Frank et al. | |
| 6,032,202 A | 2/2000 | Lea et al. | |
| 6,049,711 A | 4/2000 | Ben Yehezkel et al. | |
| 6,052,750 A | 4/2000 | Lea | |
| 6,085,236 A | 7/2000 | Lea | |
| 6,131,028 A | 10/2000 | Whitington | |
| 6,148,205 A | 11/2000 | Cotton | |
| 6,154,745 A | 11/2000 | Kari et al. | |
| 6,167,046 A | 12/2000 | Terada et al. | |
| 6,170,007 B1 | 1/2001 | Venkatraman et al. | |
| 6,198,479 B1 | 3/2001 | Humpleman et al. | |
| 6,199,066 B1 * | 3/2001 | Glitho et al. | 707/10 |
| 6,199,136 B1 | 3/2001 | Shteyn | |
| 6,208,341 B1 | 3/2001 | Van Ee et al. | |
| 6,208,866 B1 | 3/2001 | Rouhollahzadeh et al. | |
| 6,218,931 B1 | 4/2001 | Asghar et al. | |
| 6,222,530 B1 * | 4/2001 | Sequeira | 715/500.1 |
| 6,223,348 B1 | 4/2001 | Hayes et al. | |
| 6,243,707 B1 | 6/2001 | Humpleman et al. | |
| 6,243,772 B1 | 6/2001 | Ghori et al. | |
| 6,259,707 B1 | 7/2001 | Dara-Abrams et al. | |
| 6,266,612 B1 | 7/2001 | Dussell et al. | |
| 6,275,865 B1 | 8/2001 | Zou | |
| 6,282,714 B1 | 8/2001 | Ghori et al. | |
| 6,288,716 B1 | 9/2001 | Humpleman et al. | |
| 6,292,554 B1 | 9/2001 | Oden et al. | |
| 6,317,028 B1 | 11/2001 | Valiulis | |
| 6,317,718 B1 | 11/2001 | Fano | |
| 6,321,092 B1 | 11/2001 | Fitch et al. | |
| 6,349,352 B1 | 2/2002 | Lea | |
| 6,359,636 B1 | 3/2002 | Schindler et al. | |
| 6,363,434 B1 | 3/2002 | Eytchison | |
| 6,388,399 B1 | 5/2002 | Eckel et al. | |
| 6,405,261 B1 | 6/2002 | Gaucher | |
| 6,463,343 B1 | 10/2002 | Emens et al. | |
| 6,496,135 B1 | 12/2002 | Darbee | |
| 6,563,430 B1 | 5/2003 | Kemink et al. | |
| 6,587,067 B1 | 7/2003 | Darbee et al. | |
| 6,600,421 B1 | 7/2003 | Freeman | |
| 6,642,852 B1 | 11/2003 | Dresti et al. | |
| 6,748,343 B1 * | 6/2004 | Alexander et al. | 702/188 |
| 6,792,469 B1 * | 9/2004 | Callahan et al. | 709/231 |
| 6,914,551 B1 | 7/2005 | Vidal | |
| 2001/0000194 A1 * | 4/2001 | Sequeira | 725/39 |
| 2001/0018663 A1 | 8/2001 | Dussell et al. | |
| 2001/0036192 A1 | 11/2001 | Chiles et al. | |
| 2001/0041561 A1 | 11/2001 | Ventulett et al. | |
| 2001/0049275 A1 | 12/2001 | Pierry et al. | |
| 2001/0049846 A1 | 12/2001 | Guzzi et al. | |
| 2001/0053274 A1 | 12/2001 | Roelofs et al. | |
| 2001/0054060 A1 | 12/2001 | Fillebrown et al. | |
| 2001/0055954 A1 | 12/2001 | Cheng | |
| 2002/0006788 A1 | 1/2002 | Knutsson et al. | |
| 2002/0019984 A1 | 2/2002 | Rakib | |
| 2002/0022991 A1 | 2/2002 | Sharood et al. | |
| 2002/0031120 A1 | 3/2002 | Rakib | |
| 2002/0033760 A1 | 3/2002 | Kobayashi | |
| 2002/0034292 A1 | 3/2002 | Tuoriniemi et al. | |
| 2002/0035403 A1 | 3/2002 | Clark et al. | |
| 2002/0035404 A1 | 3/2002 | Ficco et al. | |
| 2002/0035605 A1 | 3/2002 | McDowell et al. | |
| 2002/0035621 A1 | 3/2002 | Zintel et al. | |
| 2002/0036795 A1 | 3/2002 | Fujitani | |
| 2002/0068984 A1 * | 6/2002 | Alexander et al. | 700/17 |
| 2002/0087746 A1 * | 7/2002 | Ludtke et al. | 710/1 |
| 2003/0103088 A1 | 6/2003 | Dresti et al. | |
| 2003/0105854 A1 * | 6/2003 | Thorsteinsson et al. | 709/223 |
| 2003/0191826 A1 * | 10/2003 | Bellinger et al. | 709/220 |
| 2004/0003073 A1 | 1/2004 | Krzyznowski et al. | |
| 2004/0046677 A1 | 3/2004 | Dresti et al. | |
| 2004/0047347 A1 * | 3/2004 | Worry et al. | 370/389 |
| 2004/0054789 A1 * | 3/2004 | Breh et al. | 709/229 |
| 2005/0015764 A1 * | 1/2005 | Gaur | 718/100 |

OTHER PUBLICATIONS

*Total Remote v2.0 user guide*, 29 pages, printed from Internet- URL—http://www.griffintechnology.com/downloads/pdf/manuals/Total_Remote_user_manual.pdf, (printed Feb. 23, 2004).

* cited by examiner

METHOD, SYSTEM, AND COMPUTER PROGRAM PRODUCT FOR AUTOMATICALLY MANAGING COMPONENTS WITHIN A CONTROLLED ENVIRONMENT

CROSS-REFERENCE TO RELATED APPLICATIONS

This application claims the benefit of U.S. Provisional Application Ser. No. 60/533,220, filed Dec. 31, 2003, by Krzyzanowski et al., entitled "Method, System, and Computer Program Product for Automatically Managing Components within a Controlled Environment," incorporated herein by reference in its entirety.

This application is also a continuation-in-part of U.S. patent application Ser. No. 10/382,897, filed Mar. 7, 2003 now U.S. Pat. No. 6,792,323, by Krzyzanowski et al., entitled "Method, System, and Computer Program Product for Managing Controlled Residential or Non-Residential Environments," incorporated herein by reference in its entirety; which is a continuation-in-part of U.S. patent application Ser. No. 10/180,500, filed Jun. 27, 2002, by Krzyzanowski et al., entitled "Method, System, and Computer Program Product for Managing Controlled Residential or Non-Residential Environments," incorporated herein by reference in its entirety.

The following U.S. patent applications of common assignee are related to the present application, and are herein incorporated by reference in their entireties:

"User Interface for Multi-Device Control," U.S. Provisional Ser. No. 60/516,302, by Killian et al., filed Nov. 3, 2003;

"User Interface for Multi-Device Control," U.S. patent application Ser. No. TBD, (Attorney Docket No. 2100.0060001), by Killian et al., filed concurrently herewith; and "Legacy Device Bridge for Residential or Non-Residential Networks," U.S. patent application Ser. No. 10/387,590, by Krzyzanowski et al., filed Mar. 14, 2003.

BACKGROUND OF THE INVENTION

1. Field of the Invention

The present invention relates generally to a method for controlling consumer electronic devices, and more specifically, to a method for controlling consumer electronic devices through a sequence of command operations that (i) can be defined to execute automatically at a particular time and/or upon the occurrence of a particular event, or (ii) can be automatically particularized for application in a specific context.

2. Related Art

The dawn of the information age has revealed new and exciting opportunities for computer processing capabilities. Personal computers have been deployed in a variety of arenas to gain efficiencies, reduce cost, and increase productivity. Miniaturization and portability have made personal computers more accessible and a more valued tool in many business environments. Personal computers have also become a very useful tool in non-business environments, including educational institutions and homes.

Home computer networks are gaining increased popularity. Within a home, multiple personal computers can be connected together to permit a user to share files without having to manually carry a diskette from one room to another. The computer network also permits the user to share printers, fax machines, and other devices. Internet access facilities can also be provided to permit access to external networks and services. Thus, a user can operate a home computer to gain instant access to information from anywhere in the world.

Despite the increasing presence of home computer networks, several significant problems must be overcome. For example, installing a home network can be time extensive and expensive to deploy. Additionally, there is no easy method to integrate home computer networks with other residential devices, such as televisions, stereos, DVD players, and other home electronics. Being able to efficiently distribute digital audio/video (AV) data among personal computers and other AV devices (such as, televisions, DVD players, PVRs, etc.) is complicated by differing and evolving communications standards and/or formats.

Another significant challenge is being able to effectively control the networked residential devices. Although a remote control unit can be trained to send signals to components of an entertainment center (such as, a television, stereo, and VCR), there is no known central device that can communicate and control multiple personal computers and other analog and/or digital devices at a residence. In addition, there is no known device that can communicate and control multiple residential devices without user intervention. Even with a remote control unit, a user must manually activate a hard key to send a command (in the form of infrared signals) to a controllable CE device.

Although the combination of improved computer processing capabilities and global access to information has resulted in significant advancements in the information processing age, there exists a need for a simple, inexpensive, yet versatile system that can integrate the functions of multiple residential devices connected to a residential network and facilitate the operations of these devices with minimal user intervention.

SUMMARY OF THE INVENTION

A method, system, and computer program product are provided to manage a plurality of devices and/or applications within a controlled-environment, such as a home, business, school, etc, as well as its surrounding areas. A control center comprises one or more servers or other data processing devices, and enables centralized command and control of the devices and/or applications.

In embodiments of the present invention, a portable controller (such as a personal digital assistant, wireless notepad, etc.) enables a user to interact with the control center. Such interaction includes altering the configuration and performance of the other devices and/or applications. Accordingly, the portable controller provides remote access to other devices and/or applications, and enables the user to control their functions and/or operations from any location within the environment.

In an embodiment, the portable controller is a handheld platform having a graphic display that has wireless connectivity to the control center that controls the other devices and/or applications within the controlled environment via a wireless network (e.g., as specified by IEEE standards 802.11a, 802.11b, 802.11g, etc.). In another embodiment, the control center is built into the portable controller. In another embodiment, the portable controller communicates directly with the other devices and/or applications via infrared (IR) code signals.

In an embodiment, one or more control macros can be established to control the operations and/or functions of the system components. A control macro includes a set of commands that, when executed, enables the control center to control multiple operations and/or functions of the system components. The control macro (i.e., set of commands) can be associated with a control macro filename for future recall and execution.

A user can define a control macro by operating the portable controller, another computer client, or a user interface in communications with the control center. In an embodiment, the control macro is stored at the portable controller. When a user activates the control macro, the portable controller sends a request to the control center, which, in turn, sends a sequence of command signals to perform the requisite functions to produce a desired outcome (such as, turning on a DVD player and an associated television, and instructing the DVD player to begin playing a DVD movie).

In another embodiment, the control macro is automatically executed with little or no user intervention. The control macro is activated through a sequence of command operations that can be defined to execute automatically upon the occurrence of a commencement parameter, or can be automatically particularized for application in a specific context. A commencement parameter can be a predefined time, date, state, event, or the like, or any combination thereof.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable one skilled in the pertinent art(s) to make and use the invention. In the drawings, generally, like reference numbers indicate identical or functionally or structurally similar elements. Additionally, generally, the leftmost digit(s) of a reference number identifies the drawing in which the reference number first appears.

DETAILED DESCRIPTION OF THE INVENTION

Table of Contents

I. System Overview
II. Location Awareness
III. Profiling Portable Controller for Personalized Use
IV. Exemplary System Implementation I. System Overview The present invention is directed towards the centralized command and control of a plurality of devices and/or applications within a controlled environment, such as a residence, business, school, etc. A residential controlled environment includes the confines of a home, apartment, mobile home, houseboat, or other types of residences. However in embodiments, a residential environment includes the surrounding area of the residence, as well as any shelters, constructs, improvements, or the like, within a designated perimeter.

In other embodiments, the present invention is implemented in non-residential environments. A non-residential environment includes, but is not limited to, an office complex, suite of small offices, production studio, warehouse, entertainment arena, school or university, health care facility, hotel, vacation resort, aircraft, ship, automobile, or the like. In embodiments, the controlled environment for the non-residential embodiments include not only the actual confines of the aforementioned structures but also their surroundings within a designated perimeter.

Examples of a controlled environment are described in the application entitled "Method, System, and Computer Program Product for Managing Controlled Residential or Non-Residential Environments" (U.S. patent application Ser. No. 10/382,897), and the application entitled "Method, System, and Computer Program Produce for Managing Controlled Residential or Non-Residential Environments," (U.S. patent application Ser. No. 10/180,500), both of which are incorporated herein by reference as though set forth in their entireties. As described in these applications, various methods and systems can be provided to manage the distribution of information (including video, audio, voice, text, graphics, control messages, etc.) to the other devices and/or applications within the controlled environment. Such devices and/or applications include, but are not limited to, communications equipment (such as, telephones, intercoms, etc.), entertainment systems (such as, televisions, CD/DVD players, gaming applications, stereos, etc.), monitoring systems (such as, security cameras, baby monitors, etc.), safety/security systems (such as, fire alarms, sprinkler systems, locks on doors or windows, etc.), personal computers (such as, desktops, notebooks, notepads, personal digital assistants, etc.), cooking appliances (such as, ovens, coffee makers, electrical food/beverage warmers, etc.), comfort systems (such as, heating and air conditioning (HVAC), humidifiers, dehumidifiers, air purifiers, light switches, light dimmers, etc.), power outlets, power supplies, or the like.

Figure 1:
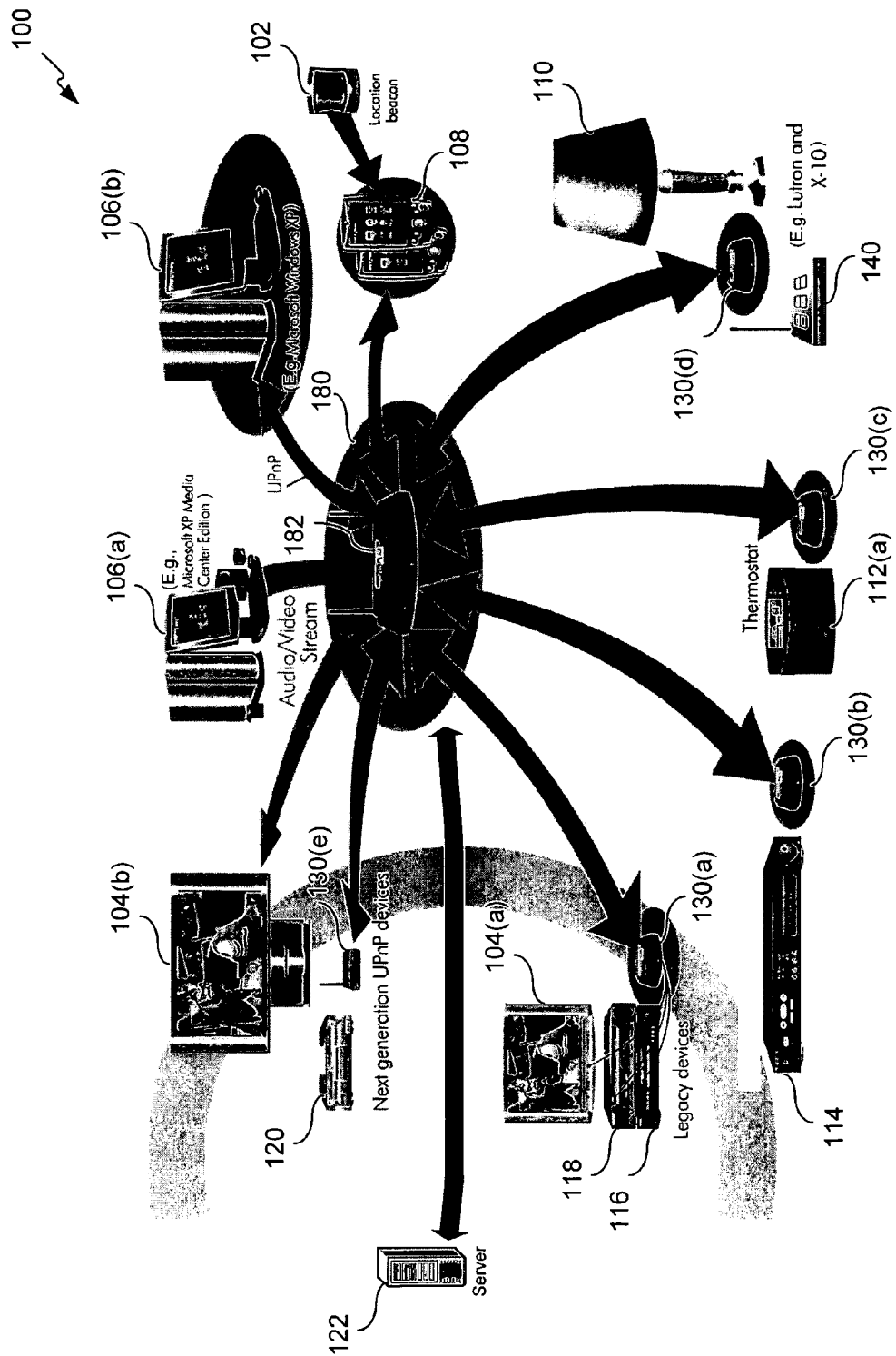
FIG. 1 illustrates a controlled system according to an embodiment of the present invention

An example of such controlled environments are shown in FIG. 1, which illustrates a residential controlled system 100 according to an embodiment of the present invention. System 100 includes a communications network 180 that interconnects a plurality of system components. The system components include a positioning unit 102, two televisions 104 (shown as television 104(a) and 104(b)), two computer clients 106 (shown as computer client 106(a) and computer client 106(b)), one or more portable controllers 108, a lighting device 110, a thermostat 112 for a HVAC system, a tuner 114, a media player 116, a cable box 118, a DSS box 120, and one or more central servers 122. Other devices and/or applications can also be included as system components.

Positioning unit 102 designates spatial locations within the residence that serves as the hosting environment for system 100. Positioning unit 102 is coupled to the other system components (e.g., portable controller 108) via a wired and/or wireless interface. Positioning unit 102 is operable to designate a floor or room within the residence. Positioning unit 102 is also operable to designate a specific location or region within a floor or room. Moreover, positioning unit 102 can be situated outside of the residence to thereby designate external areas of the residence.

Computer client 106 includes a wired and/or wireless personal computer, personal digital assistant (PDA), enhanced telephone, personal television, or other data processing device linked to communications network 180. As a personal computer, computer client 106 can be a desktop, notebook, notepad, or the like. A display is coupled to computer client 106 to provide a text or graphical user interface (GUI) and enable a user to interactively communicate with server 122. Input devices for computer client 106 include a keyboard, mouse, verbal command interface, mouse wheel, joystick, rudder pedals, touch screen, microphone, joystick, stylus, light pen, or any other type of peripheral unit.

Portable controller 108 is a wired and/or wireless data processing device that enables a user to interact with, send control messages to, and/or manage the distribution of information (including audio, video, voice, and other data) among the other system components. Portable controller 108 can be a portable version of the devices listed as computer client 106. For example, portable controller 108 can be a personal notebook or notepad computer, PDA, enhanced telephone, or other device linked to communications network 180 and including a display with the ability to interact with the other system components. Hence, portable controller 108 enables a user to remotely control the operations of various components of system 100. In an embodiment, the display for portable controller 108 is capable of receiving video and/or audio from the other system components. In an embodiment, portable controller 108 includes a flash ROM that enables wireless downloads and/or uploads.

Television 104 is a conventional television. In an embodiment, television 104 is enhanced to support interactive and/or personal services. Personal services include virtual recording, programming, pausing/rewinding live broadcasts, or the like. For example, television 104 can be a personal television enhanced to support the MSN® TV service, hosted by WebTV Networks, Inc. (Mountain View, Calif.), that supports the WEBTV® services available from Microsoft Corporation (Redmond, Wash.). As shown, television 104 can be connected to cable set-top box 118, DSS set-top box 120, and/or media player 116 (e.g., PVR, VCR, or DVD player).

One or more servers 122 police all traffic among the other system components. The exchange of information among the system components is routed or otherwise controlled via server 122. As such, server 122 interacts with the other system components to directly or indirectly distribute data (including audio and/or video), voice, and/or control messages over communications network 180. In an embodiment, server 122 commands and controls the operation and/or functions of one or more of the other system components. The functions managed by server 122 includes video serving, audio serving, telephony, messaging, file sharing, Internet access, and security. According to embodiments of the present invention, a user operates portable controller 108 to establish or re-configure these functions and/or receive media from server 122 or other system components (either directly from the other system components or indirectly from the system components via server 122).

In an embodiment, portable controller 108 includes several functions of server 122, as described herein, and manage the distribution of information (including audio, video, voice, and other data) among the other system components. In another embodiment, communications network 180 supports peer-to-peer communications. As such, the system components exchange audio, video, voice, other data, and/or control messages directly with each other and without being centrally managed by server 122.

The aforementioned system components are not intended to be exhaustive. Other devices (including appliances), applications, and/or the like can be implemented, including, but not limited to, a refrigerator, stove, microwave, toaster, coffee-maker, alarm clock, humidifiers, sprinkler system, lighting, light dimmers, etc. In an embodiment, server 122 and/or portable controller 108 controls the operations and/or functions of such components, such as on/off, timers, modulation (e.g., oven temperatures, etc.), pause, snooze, etc.

As discussed, communications network 180 provides a transmission medium for communicating among the system components. Communications network 180 is a wired and/or wireless local area network (LAN). Thus, communications network 180 includes wired, wireless, or both transmission media, including satellite, terrestrial (e.g., fiber optic, copper, UTP, STP, coaxial, hybrid fiber-coaxial (HFC), or the like), radio, microwave, free-space optics, and/or any other form or method of transmission.

In an embodiment using a wired transmission medium, communications network 180 is an Ethernet LAN having a CAT-5 cable, or the like, that is coupled to server 122 and distributed to a location within each room. In an embodiment, the cable is distributed to each system component, such as television 104, media player 116, etc. The system component includes an audio/video (AV) connector that is responsive to receive the cable. In an embodiment, communications network 180 includes a telephone line and/or powerline (such as, the communications technologies made available from the Home Phone Networking Alliance (HomePNA) or the like).

In an embodiment using a wireless transmission medium, communications network 180 supports the IEEE standard 802.11(a), which specifies a wireless Ethernet protocol for large-sized video. In another wireless embodiment, communications network 180 supports the IEEE standard 802.11(b), which specifies a wireless Ethernet protocol for small-size video. In another wireless embodiment, communications network 180 supports the IEEE standard 802.11(g). In another embodiment, the BLUETOOTH™ wireless technology (developed by Bluetooth SIG, Inc.) is used to support short-range wireless interfaces with system 100.

As shown in FIG. 1, communications network 180 includes a wireless network access point 182, such as those available from Linksys Group Inc. (Irvine, Calif.) or Cisco Systems, Inc. (San Jose, Calif.), as a platform for the system components. A wireless access point 182 provides a central point for connectivity in a wireless network and always-on connectivity necessary for tracking states of the system components. Additionally, a wireless access point 182 can provide a connection point between a wired and wireless network. In an embodiment using a server 122, as discussed above, a wireless access point 182 serves as a platform for the server 122. In alternative server-based embodiments of the present invention, the server 122 can actually be located on a number of different device platforms in addition to a wireless access point (such as, wireless access point 182 shown at 180), including a bridge device (such as, bridges 130(*a*)–130(*e*)), a personal digital assistant (such as, 108), a personal computer (such as, 106), or the like.

System 100 also includes a plurality of infrared/serial bridges 130(*a*)–130(*d*), which comply with the IEEE 802.11 (b) standard for wireless communications. Each infrared/serial bridge 130 interacts with one or more components. As shown, infrared/serial bridge 130(*a*) interacts with television 104(*a*), cable box 118, and media player 116. Infrared/serial bridge 130(*b*) interacts with tuner 114 or any type of proprietary device that rely on infrared/serial communication protocols as would be apparent to one skilled in the relevant art(s). Infrared/serial bridge 130(*c*) interacts with thermostat 112. Infrared/serial bridge 130(*d*) interacts with lighting device 110. A wireless-Ethernet bridge 130(*e*) interacts with television 104(*b*) and a DSS box 120. Wireless-Ethernet bridge 130(*e*) can support any IP addressable device. As such, television 104(*b*) and DSS box 120 are "next generation" UPnP devices that have IP addresses.

Therefore, the present invention can integrate legacy devices (e.g., consumer electronic (CE) devices that rely on infrared/serial communication protocols), as well as UPNP™ devices and applications defined by the Universal Plug and Play (UPnP) Forum, as system components. An example of a controlled environment implementing an IEEE 802.11(b) infrared/serial bridge is described in the application entitled "Legacy Device Bridge for Residential or Non-Residential Networks" (U.S. patent application Ser. No. 10/387,590; filed Mar. 14, 2003), which is incorporated herein by reference as though set forth in its entirety.

As described above, portable controller 108 (such as, a digital personal assistant, wireless notepad, etc.) enables a user to remotely alter the configuration and performance of other devices and/or applications from any location within the controlled environment. In an embodiment, portable controller 108 is a handheld platform having a graphic display that has wireless connectivity to a central server 122 that can control the other devices and/or applications within a controlled environment via a wireless communications network 180 (e.g., as specified by IEEE standard 802.11b). In another embodiment, the server 122 is built into portable controller 108. In another embodiment, portable controller 108 communicates directly with the other devices and/or applications via infrared (IR) code signals.

In an embodiment, the present invention facilitates control of a system comprising an output system component (e.g., a television, a monitor, a speaker, etc.) having multiple input system components (e.g., DVD, VCR, satellite tuner, digital video recorder, stereo, etc.). In accordance with the present invention, the user first selects the output component via the GUI presented on portable controller 108. The user is then presented with a control screen affording the user with the ability to select a specific input component using a "tabbed" interface. When that input is selected, the control screen for that component is presented. Examples of user interfaces for associating and controlling various system components are described in the application entitled "User Interface for Multi-Device Control" (U.S. Patent App. Ser. No. 60/516,302), which is incorporated herein by reference as though set forth in its entirety.

II. Location Awareness

In embodiments of the present invention, network control system 100 tracks and/or monitors the positions of various system components (herein referred to as the "target components") in real time or near term. As a user migrates within the controlled environment that hosts system 100, the present invention can implement several protocols to enable system 100 to determine a location of a target component and hence, the location of the user in communications with the target component. In an embodiment, a control center (e.g., server 122, a local processor coupled to the target component, etc.) determines the current location of the target component (e.g., portable controller 108, etc.), and sends instructions to reconfigure the target component to control other system components within a specified vicinity. For example, if portable controller 108 is determined to be located within a dining area, server 122 enables portable controller 108 to be capable of controlling system components positioned in the dining area. Such components can include light dimmers, audio systems, heating units for food servers, or the like.

Positioning units 102 are utilized in several embodiments for tracking and/or monitoring target components. As described above with reference to FIG. 1, one or more positioning units 102 are distributed throughout the controlled environment that hosts system 100. The positioning units 102 can be coupled to a target component (e.g., portable controller 108, an audio client, telephone, etc.), or located as a stand-alone device within the controlled environment.

In an embodiment, positioning unit 102 is part of a RF communications system. As such, a RF transponder interacts with a RF interrogator to communicate positioning information. The transponder is coupled to a system component and makes available identification information that uniquely identifies the system component. The transponder can make available other types of information, including an assigned location of the system component if the component is a stationary or infrequently moved device. Therefore, the transponder can be coupled to either the target component or a positioning component (e.g., positioning unit 102).

The transponder can be active or passive. An active transponder transmits a continuous or periodic signal containing the identification information. A passive transponder remains inactive and/or silent until it is activated by, for example, an interrogator, or manually activated by a user. Therefore, the system component (that includes the transponder) can operate in a silent mode or active mode. In active mode, the position of the system component (i.e., the target component) is being tracked and/or monitored in real time or near term. In silent mode, the current position of the system component (i.e., the target component) is not known to system 100 with absolute certainty until the transponder is activated.

The interrogator is coupled to another system component and receives positioning information (e.g., identification information or the like) when it comes within the communications range of a transponder. The interrogator will automatically receive the positioning information from an active transponder, or will activate a passive transponder to receive the positioning information.

The interaction between a transponder and an interrogator is further explained in the application entitled "Method, System, and Computer Program Product for Managing Controlled Residential or Non-Residential Environments" (U.S. patent application Ser. No. 10/382,897), and the application entitled "Method, System, and Computer Program Produce for Managing Controlled Residential or Non-Residential Environments," (U.S. patent application Ser. No. 10/180,500). As discussed, various positioning technologies can be implemented with the present invention for tracking and/or monitoring the location of system components, including, for example, RF communications, the Bluetooth™ wireless technology (developed by Bluetooth SIG, Inc.), bar coding technologies, GPS receivers, cellular signals, triangulation, or the like.

In an embodiment, positioning can be realized without the use of positioning unit 102. Portable controller 108, or the like, is responsive to receive and process commands from the user operating portable controller 108. The commands are manually and/or verbally entered into portable controller 108. Portable controller 108 processes the commands, or sends the commands to server 122, to determine the location. For example, the user can specify the location "living room," and the portable controller 108 would be profiled to control devices and/or applications in the living room.

In another embodiment, however, voice and/or manual commands can be entered into positioning unit 102 or the like. The user would also enter an identifier for the target component (e.g., portable controller 108), and position unit 102 would send control signals to server 122, or the like, to update the location records of target component.

Figure 2:
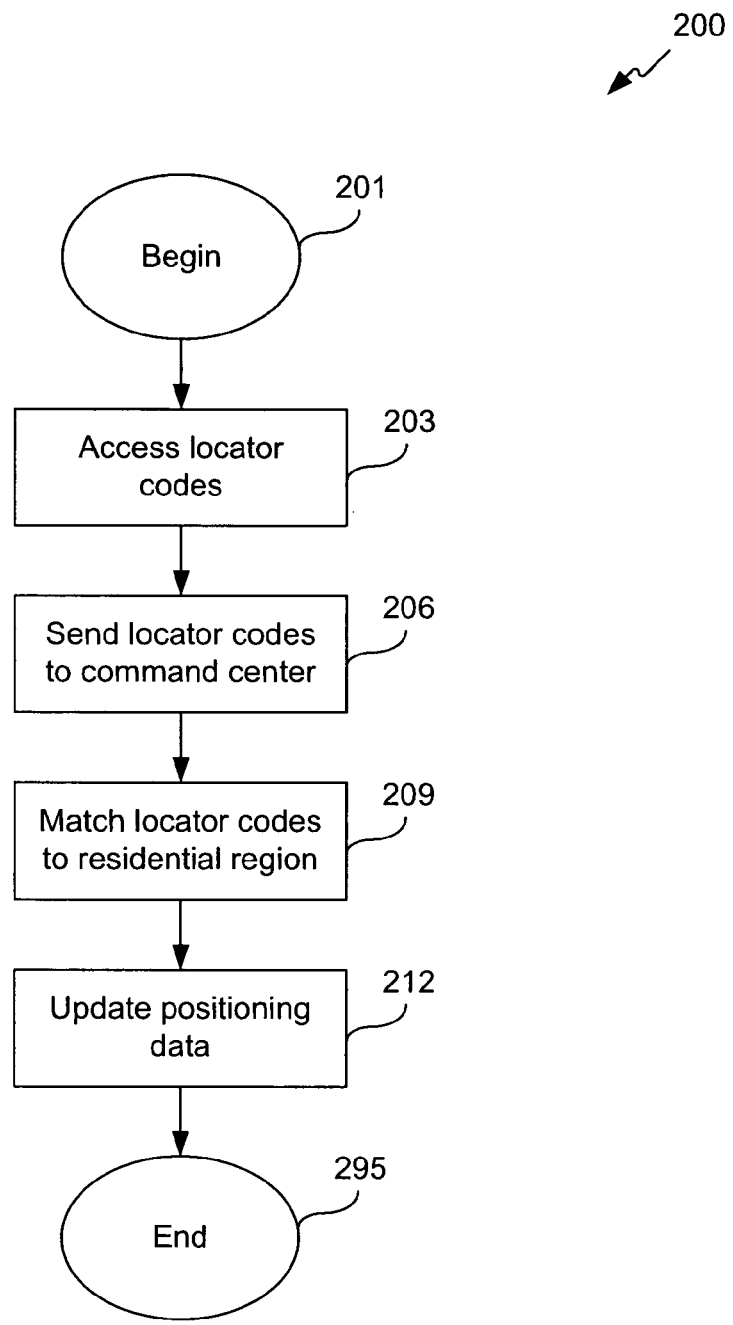
FIG. 2 illustrates tracking and/or monitoring system components according to an embodiment of the present invention.

As described above, the present invention supports various protocols for gathering location information. The present invention provides several methods and/or techniques for processing the location information to track and/or monitor the position or movement of various components of system 100. Referring to FIG. 2, flowchart 200 represents the general operational flow of an embodiment of the present invention. More specifically, flowchart 200 shows an example of a control flow for tracking and/or monitoring system components within a controlled environment.

Referring to FIG. 2, the control flow of flowchart 200 begins at step 201 and passes immediately to step 203. At step 203, an appropriate component of system 100 accesses identification information or locator codes that correspond to a system component (i.e., target component) that is being tracked and/or monitored. Referring back to FIG. 1, the present invention can determine the current position of any of the aforementioned system components, including, but not limited to, positioning unit 102, television 104, computer client 106, portable controller 108, lighting device 110, tuner 114, media player 116, cable box 118, DSS box 120, server 122, a telephone, a security camera, a security monitor, an audio client, and/or other devices and/or applications. Additionally, as described above, the present invention includes various embodiments for accessing locator codes. The locator codes include an identifier for the transmitting or polled portable controller 110 or other system component. The locator codes can also include other identification codes or information for the polled or transmitting system component. In an embodiment, the other identification information includes a vicinity identifier, or the like, for the region (e.g., floor, room, etc.) of the residential environment where the transmitting or polled portable controller 108, positioning unit 102, or other system component, is located.

In an embodiment, a user interacts with a text or graphical interface to manually enter the current location for a target component. In another embodiment, a voice command interface enables the user to enter voice commands for a target component. As such, the user verbally communicates the current location.

In another embodiment, a target component interacts with positioning unit 102 to access locator codes. For example, the target component (e.g., portable controller 108, etc.) can be coupled to interrogator, which polls positioning unit 102 for a vicinity identifier. The vicinity identifier includes locator codes for the current location for both system components.

According to another example, the interrogator can be integrated with positioning unit 102. Hence, a target component (e.g., portable controller 108, etc.) is polled by the interrogator. As a result, the interrogator receives an identifier for the polled target component. Locator codes are produced by associating the identifier with the vicinity identifier for interrogator.

At step 206, the locator codes are sent to a command center for further positioning processing. In an embodiment, the command center is server 122. In another embodiment, the command center is at the target component (e.g., portable controller 108, computer client 106, etc.).

At step 209, the locator codes are matched to a region. The region can be a specific floor, hallway, corridor, balcony, room, or the like. The region can be a specific area within a floor, hallway, corridor, balcony, room, or the like. The region can also be a specific area within an external perimeter of the residence hosting system 100, or an adjoining or free-standing shelter on the residential grounds.

At step 212, the current region is communicated to the target component and/or stored in the records of server 122 for future recall. After the system component has been positioned and its positioning data has been updated, the control flow ends as indicated at step 295.

Figure 3:
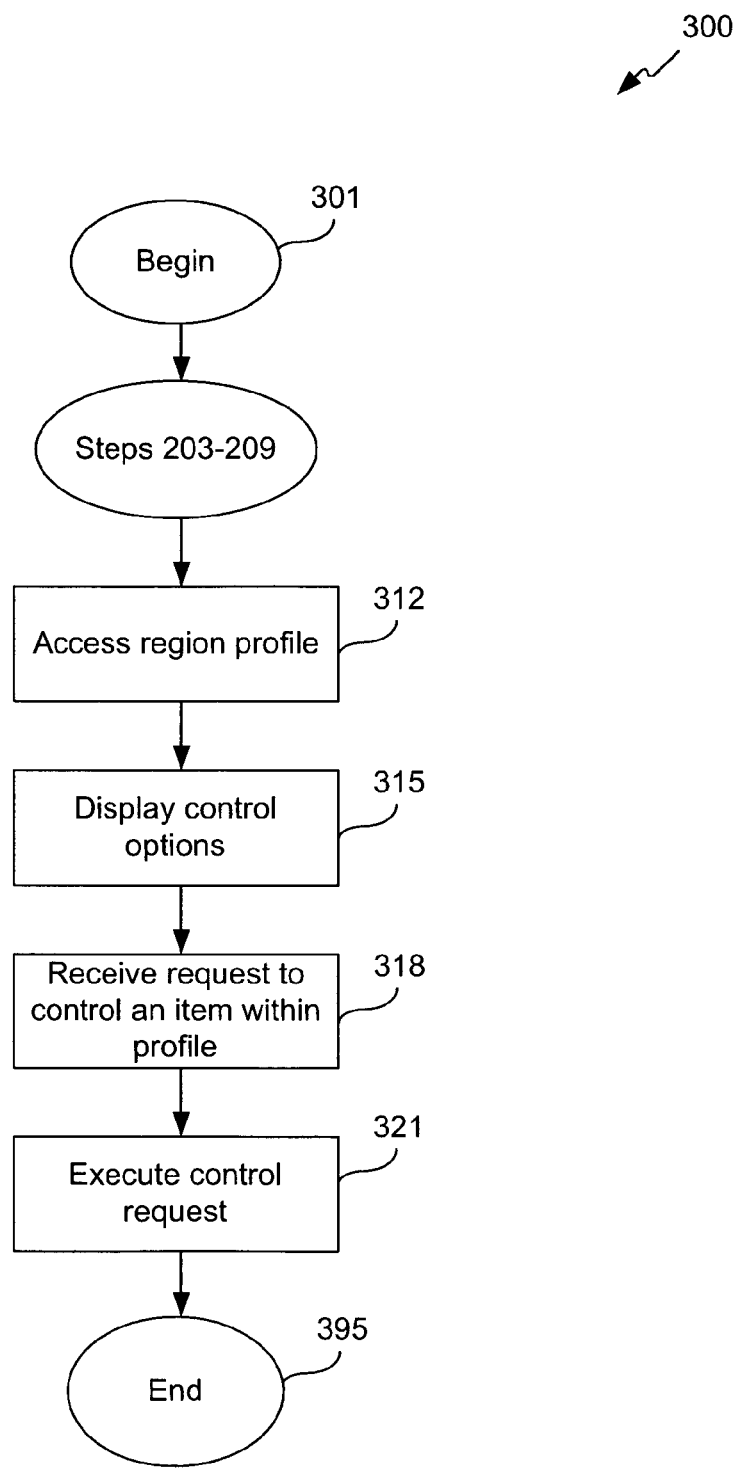
FIG. 3 illustrates commanding and/or controlling system components in response to user location according to an embodiment of the present invention.

In an embodiment, the positioning information enables system 100 to command and/or control specific system components based on the current location of a user interacting with system 100. This can be described with reference to FIG. 3. Flowchart 300, as illustrated in FIG. 3, represents the general operational flow of an embodiment of the present invention. More specifically, flowchart 300 shows an example of a control flow for commanding and/or controlling system components based on a user's current location.

Referring to FIG. 3, the control flow of flowchart 300 begins at step 301 and passes immediately to steps 203–209. As described with reference to FIG. 2 at steps 203–209, locator codes enable system 100 to determine the current location or region of a user interacting with a target component (e.g., portable controller 108).

At step 312, a region profile is accessed for the region. The region profile includes a listing of devices and/or applications (i.e., system components) that receive commands and/or controls from server 122 and/or portable controller 108 within a region.

At step 315, the region profile is processed to present control options for the user to review. The control options include the listing of devices and/or applications corresponding to the region profile. As described with reference to FIG. 2, the positioning can be determined remotely at server 122 or locally at the target component (e.g., portable controller 108). If determined remotely, server 122, for example, produces and sends a user interface to display the control options on the target component (e.g., portable controller 108 or another system component the user is operating). If determined locally, the target component (e.g., portable controller 108, etc.) retrieves the region profile to produce the user interface. The region profile can be sent to the target component on demand, or the target component can be updated periodically with available region profiles.

At step 318, the user operates the target component (e.g., portable controller 108, etc.) to send a request to control a system component (e.g., television 104, lighting device 110, etc.) that is identified in the region profile. The user can send a request to control a function and/or an operation of a system component. The user can send a request to alter the configuration or security profile for the component. Other control request can be sent as would be apparent to one skilled in the relevant art(s).

At step 321, the control request is executed by the designated component. The control request can be transmitted directly to the designated component, or indirectly to the designated component via server 122. After the control request has been executed, the control flow ends as indicated by step 395.

For example, if a user is operating portable controller 108 and is determined by system 100 to be positioned in the "living room," portable controller 108 would receive a user interface for controlling system components in the living room. One system component can include, for example, a security monitor that receives video input from a security camera located at the front door to the residence. The user can interact with portable controller 108 to pan, tilt, or focus the security camera to display an image on the security monitor of a visitor standing at the front door. Another system component can be television 104, and portable controller 108 can receive a user interface for controlling the volume levels or channel selections for television 104. The user can also interact with portable controller 108 to alter the settings of HVAC equipment (i.e., thermostat 112).

III. Profiling Portable Controller for Personalized Use

The present invention enables a user to operate portable controller 108 to command and/or control other system components. In an embodiment, portable controller 108 only permits the user to control system components within the vicinity of portable controller 108. In another embodiment, portable controller 108 provides the option of controlling system components in another region.

In embodiments, control of the various system components is based on preset profiles established for the user. The profiles can be generic for all users and/or specifically configured for a specific user. If configured for a specific user, the present invention utilizes various protocols to identify or authenticate a specific user and execute the profile established for the user. In an embodiment, a username and/or password is entered into a system component (e.g., portable controller 108, etc.). The password can be expressed by a verbal command, text, object, pixel, or the like. In another embodiment, biometrics are collected by a system component. As such, retinal, iris, facial, palm, fingerprint, and/or voice recognition technologies, or the like are implemented to identify and/or authenticate a user. In another embodiment, a user card is read by a system component (e.g., portable controller 108, etc.). Other user identification and/or authentication techniques can be used to identify and/or authenticate a user. The present invention permits the user to alter the profile, as appropriate. The identification and/or authentication techniques, described above, prevent other users from altering or deleting the user profile after it has been established.

In embodiments, the present invention enables a user to establish a profile to store a "favorite" setting for the system components. For example, a favorite setting can be established for television programming, audio/video recordings, room temperature, hot tub controls, clock alarms, light/dimmer settings, web sites, news broadcasts, financial channels, or the like.

In embodiments, the user can establish a profile to create a "playlist." For example, a series of video or audio recordings can be prepared and/or stored for playback on, for example, television 104 or an audio client. A sequence of graphic images or photographs can be prepared and/or stored for playback on, for example, a monitor or computer client 106. A playlist of other forms or media and/or multimedia can also be created according to embodiments of the present invention, as would be apparent to one skilled in the relevant art(s).

In embodiments, a profile can be created to establish a security protocol for the system components. For example, a profile can be created to block certain content from being accessed by designated users. Non-adult users, for instance, can be prevented from accessing designated television channels, web sites, areas (such as, lockable rooms, drawers, safes, etc.), or the like.

In embodiments, the present invention enables a single user to establish multiple profiles. Each of the multiple profiles can be tailored for context-sensitive activity. For instance, a user can create a profile for evening entertainment, which includes, without limitation, presets for lighting, audio/video presentations, security access warnings, hot tub controls, or the like. Another profile can be established for home office activities, which includes, without limitation, presets for a baby monitor, a playlist of classical recordings, coffee maker timer controls, or the like. A profile can be established for morning rituals, which includes, without limitation, presets for alarm/snooze controls, coffee maker timer controls, lighting, news broadcasts, or the like.

A user can also establish multiple profiles for use with other individuals. For example, a user can have a profile with security controls set to block certain televisions programming, web sites, audio recordings, or the like when in the company of minors. However, when in the company of adults, the user can recall another profile with more liberal security settings.

As such, the present invention enables various system components (e.g., portable controller 108, etc.) to be user aware in addition to being location aware. Thus for example, portable controller 108 can be customized per user based on the aforementioned user profiles. In embodiments, the user awareness functionality permits system 100 to implement "follow-me" system controls. For instance, "follow-me" video is implemented to transfer a selected video production to various displays throughout the controlled environment. The user would operate, for example, portable controller 108 to select a video production (e.g., television show, DVD recording, or the like). The video production can be presented on portable controller 108 (e.g., media viewer 710 described with reference to FIG. 7). As the user migrates from room to room within the controlled environment, system 100 tracks portable controller 108 and retrieves a region profile for each region. Therefore, as the user enters a new region or room, a monitor or television 104 located in the room will automatically start to display the video production selected by portable controller 108.

Similarly, "follow-me" audio can be implemented by the present invention. As such, the user can operate, for example, portable controller 108 to select an audio production (e.g., CD recording, radio broadcast, etc.). As the user migrates from room to room, the positioning techniques of the present invention enable system 100 to transfer the audio production to audio clients, monitors, or the like that are located in the vicinity of portable controller 108.

"Follow-me" lighting is another exemplary implementation of the present invention. As a user, carrying portable controller 108, enters or leave a room, system 100 sends commands to dim or turn on/off the lights (e.g., lighting device 110 based on the profile settings.

In an embodiment, one or more control macros can be established to control the operations and/or functions of the system components. A control macro includes a set of commands that, when executed, enables server 122 to control multiple operations and/or functions of one or more system components. The control macro (i.e., set of commands) can be associated with a control macro filename for future recall and execution.

Figure 4:
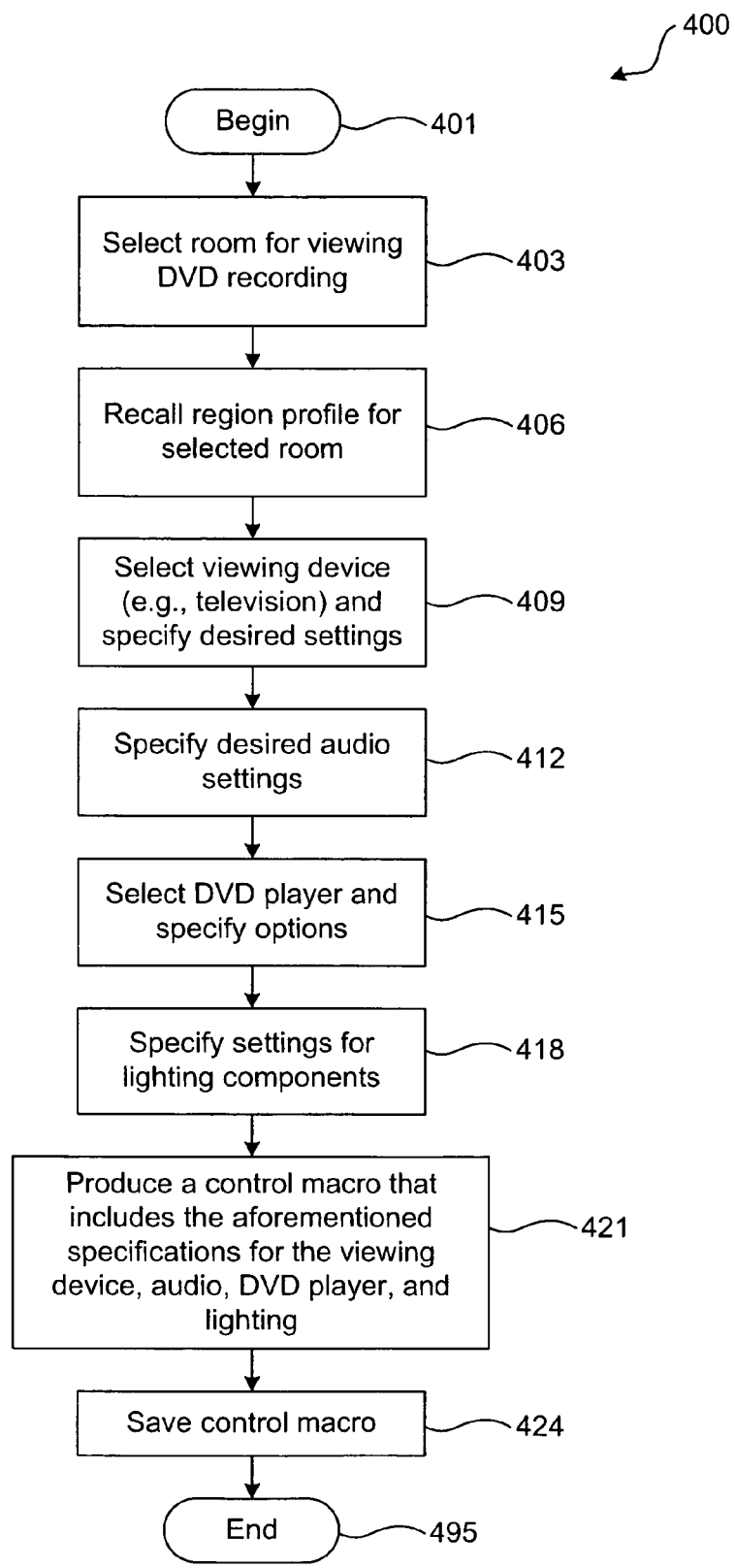
FIG. 4 illustrates defining a control macro to watch a movie recording according to an embodiment of the present invention.

A user can define a control macro by operating portable controller 108, computer client 106, or a user interface in communications with server 122. In an embodiment, a graphical user interface can be implemented to enable a user to define a new control macro. FIG. 4 provides an example for defining a control macro according to an embodiment of the present invention. Flowchart 400 shows an example of a control flow for defining a control macro to watch a movie recorded on DVD.

Referring to FIG. 4, the control flow of flowchart 400 begins at step 401 when the user triggers a record-macro command to distinguish the macro-recording mode from normal system operations. At step 403, the user operates one of the aforementioned devices (i.e., portable controller 108, computer client 106, or a user interface to server 122) to select a room containing the system component (e.g., television 104, monitor, etc.) that the user intends to use to view the movie.

At step 406, the region profile for the selected room is recalled. As discussed above, a region profile identifies all system components located in a designated region. In an embodiment, the region profiles are stored at server 122, which retrieves and makes the appropriate region profile available to the user.

At step 409, the user reviews the region profile and selects a viewing system component (e.g., television 104). The user also specifies the video input for a DVD source (e.g., media player 116). The user can specify any desired settings, including but not limited to, contrast, brightness, and the like.

At step 412, the user specifies the desired audio settings. In an embodiment, the user sets the volume level for the viewing system component (e.g., television 104). In another embodiment, the user selects external speakers or other audio clients to be used in addition to, or in lieu of, the internal speakers for the viewing system component (e.g., television 104).

At step 415, the user selects the desired DVD movie from a DVD player (i.e., media player 116). Alternatively, if the DVD player is located in the same room with the selected viewing system component (e.g., television 104), the user can instruct media player 116 to beginning playing the movie currently loaded, or simply open the media bay and wait for the user to manually insert the desired DVD.

At step 418, the user specifies the settings for lighting devices 110 denoted in the region profile. The user can dim the lighting to a desired comfort level. In an embodiment, lighting device 110 includes the RadioRA home dimming system available from Lutron Electronics Company, Inc. (Coopersburg, Pa.). As such, the present invention enables the creation of control commands for operating the RadioRA dimming system. Referring back to FIG. 1, lighting device 110 is an exemplary lighting system that is controlled by a signal repeater 1202 for a dimming system, such as Lutron's RadioRA or X-10 dimming systems.

At step 421, the control commands for executing the specifications for television 104, audio client 118 (if selected), media player 116, and lighting device 110 are collectively associated with a common control macro.

At step 424, the user saves the control macro and gives it a filename, such as "watch movie." In an embodiment using portable controller 108 to create macro "watch movie," the user can associate the macro to a specific macro button or icon. Therefore, when the user activates the "watch movie" macro button, all of the associated commands for implementing the user's pre-specified selections are recalled and executed, so that television 104 is ready to play the desired movie. After the control macro is created and saved, it is ready for activation and the control flow ends as indicated at step 495.

In an embodiment, the commands associated with a specific control macro are stored at server 122, or in a database or library affiliated with server 122. Therefore, in an embodiment using portable controller 108 to execute a control macro, portable controller 108 enables a user to associate a control macro with a control macro button or icon. When executed, the control macro button transmits a generic command to server 122. Server 122, in turn, retrieves the set of commands associated the generic command, and transmits the set of commands to the appropriate system components for execution. In other words, the present invention enables a mobile device, such as portable controller 108, to transmit a single high-level request to a centralized command center, such as server 122. Server 122 interprets the single request according to its environment (e.g., user, location) and finds the corresponding sequence of commands that needs to be transmitted over communications network 180, which includes wireless (or powerline) communications.

Alternatively, according to an embodiment of the present invention, a control macro can be created automatically by the server 122 based on the particular devices and/or applications existing in a selected room or region, either as known by server 122 through stored room profiles or as detected in real time by server 122 as the room profile is created. For example, if server 122 detects that a room such as the living room has a DVD player (i.e., media player 116) and a television 104, the control server will automatically build a basic "watch movie" macro comparable to the macro described above, which can be further customized by the user.

Figure 5:
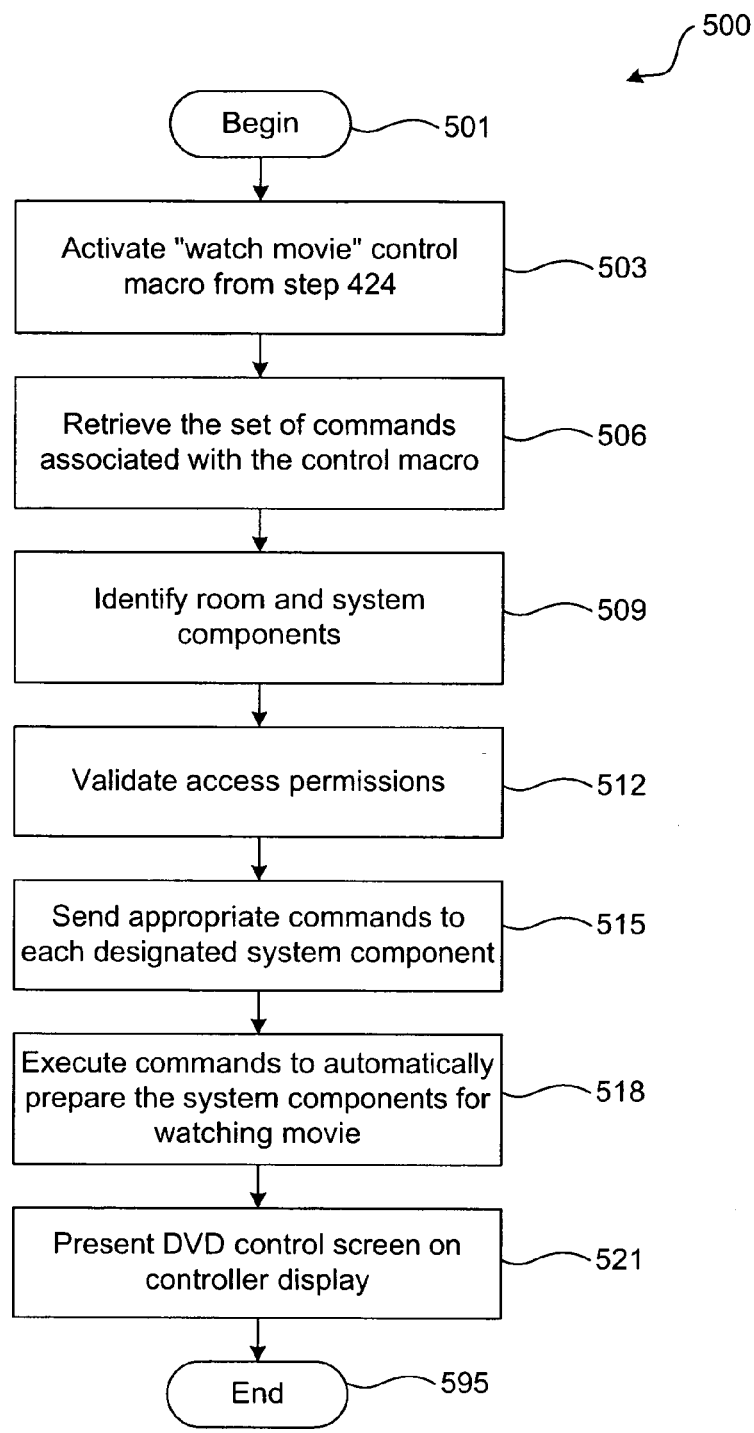
FIG. 5 illustrates activating the control macro of FIG. 4 according to an embodiment of the present invention.

FIG. 5 illustrates an example for activating a control macro according to an embodiment of the present invention. Flowchart 500 shows a control flow for activating the control macro of flowchart 400, which pertains to watching a movie recorded on DVD.

Referring to FIG. 5, the control flow of flowchart 500 begins at step 501 and passes immediately to step 503. At step 503, the user activates the "watch movie" control macro defined in steps 401–495.

At step 506, the set of commands associated with the "watch movie" control macro is recalled from their storage location. The set of commands includes the user-predefined specifications for controlling the functions and/or operations of the specified system components. In this example, the set of commands associated with the "watch movie" control macro includes commands for altering lighting device 110, activating media player 116, and activating television 104. If the user desires to listen to the movie on a home stereo speaker system, the set of commands would also include commands for activating the appropriate audio system component.

In an embodiment using portable controller 108 to activate the control macro, portable controller 108 transmits a generic command that was associated with the "watch movie" control macro. The generic command is sent to server 122, which recalls the set of commands associated with the generic command for the "watch movie" control macro.

At step 509, the room and system components (e.g., television 104 or media player 116, lighting device 110, audio client) are identified from the set of commands. In the example described with reference to FIG. 4, the room is specified in the control macro. However, in another embodiment, the control macro, itself, does not need to be room specific. As discussed above, the present invention includes methodologies and/or techniques for tracking the location of a user or portable controller 108. Therefore, the user can request to activate a control macro (such as, the "watch movie" control macro) to watch a movie in any room the user is currently located. As such, server 122 would designate the user's current location as being the room for implementing the control macro. Likewise, server 122 can retrieve the room profile for the user's current location and identify the viewing components, media player, and lighting components that are located in the designated room.

At step 512, device access permission is validated for each system component identified at step 509. As discussed above, restrictions on operating various system components can be established and policed by a security protocol implemented by server 122. Accordingly, the present invention provides methodologies and/or techniques for identifying or authenticating the user that is requesting the "watch movie" control macro, as well as for determining if the user is authorized to operate the system components (including the actual DVD) designated in the control macro. If the user is determined to lack authorization for accessing the designated system components, a message can be sent to inform the user that access has been blocked.

At step 515, the present invention determines which commands are associated with each system component identified at step 509. For example, the control commands for specifying the viewer settings are queued for television 104. Similarly, the control commands for specifying the lighting settings are queued for lighting device 110.

In an embodiment, server 122 apportions the component-specific commands for each system component. The component-specific commands are encoded and sent to the designated system component via the appropriate protocol. Server 122 also updates its records for tracking the state of each system component.

At step 518, each system component receives and executes the component-specific commands. As such, the lighting (i.e., lighting device 110) in the specified room is automatically dimmed, the specified television 104 is turned-on and configured as predefined, and the specified DVD player (i.e., media player 116) is similarly activated. Depending on the speaker options specified in the control macro, the identified audio component is also activated and waits to receive audio feed from the DVD player.

At step 521, a control screen is sent to the user interface that the user operated to activate the control macro. If portable controller 108 is used, the control screen is presented on the display to designate that the control macro has been properly executed and the DVD movie is ready to commence playing (or the DVD player is ready to receive the desired movie, if this option is selected). Afterwards, the control flow ends as indicated at step 595.

As discussed above, when a user presses a particular key, on portable controller 108, that has been assigned by the user to perform the basic "watch movie" macro, portable controller 108 sends a request to a central network server 122. The central server 122, in turn, has wireless network connectivity to various CE devices via an 802.11/IR bridge 130. Therefore, upon receipt of the "watch movie" request from portable controller 108, the server 122 sends a sequence of command signals to perform a number of functions enabling the user to watch a DVD (e.g., turning on the media player 116 and the associated television 104 or monitor, and instructing media player 116 to begin playing the DVD).

The present invention is not limited to a hard-key implementation. In an embodiment, portable controller 108 is a PDA with a screen, which serves as a wireless interface to central network server 122. In this embodiment, upon the user's activation of a "soft" "watch movie" macro button or icon on the GUI for portable controller 108, the user's "watch movie" macro request is forwarded to the server 122, which in turn sends the appropriate commands to the television 104 and media player 116, both of which have networked connectivity to the server 122. The advantage of the present invention is that the user need not be in direct line-of-sight of the controllable devices, which is a requirement for a conventional IR remote control unit.

According to an embodiment of the present invention, a user must physically commence the operation of a control macro by activation of the hard or soft key on portable controller 108. In other embodiments of the present invention, the control macro is automatically executed with little to no user intervention. The control macro is activated through a sequence of command operations that (i) can be defined to execute automatically at a particular time and/or upon the occurrence of a particular event, or (ii) can be automatically particularized for application in a specific context.

A. Time-Based Execution

In an embodiment of the present invention, a pre-defined sequence of control commands is executed upon the occurrence of a pre-set time (i.e., clock based) and/or date (i.e., calendar based) automatically (i.e., without direct user intervention). For example, the user may have a television 104 and a satellite-TV tuner 114 in his or her bedroom. The user may desire to have the bedroom television 104 automatically turned on and tuned to a particular channel at 6:30 am as part of his or her "wake up" routine. This can be achieved by a control macro consistent with the present invention.

Where the bedroom television 104 and lights 110 are connected via a wireless network 180 to central server 122, central server 122 can be programmed to power on the lights 110 and television 104 in the user's bedroom at 6:30 am and tune the satellite-TV tuner 114 to the desired channel. As discussed above, the user configures the control macro through a GUI that can be generated by the central server 122 and displayed on the screen of portable controller 108.

The central server 122 can be a PC-based device that is physically separate from portable controller 108, as shown in FIG. 1, or the central server 122 can reside in portable controller 108, itself.

In an embodiment in which portable controller 108 operates in a standalone basis without server 122, an internal clock for portable controller 108 automatically initiates the control macro at 6:30 am, whereupon portable controller 108 issues the appropriate command(s) either directly to the respective controllable component (e.g., television 104), or indirectly the controllable component via network access point 182 and/or bridges 130. The user would, therefore, configure the control macro using a GUI generated by portable controller 108.

Alternatively, a "wake-up" control macro can be configured to execute only on certain days. For example, the user may only want the "wake-up" control macro executed on weekdays. Thus, the user could program the central server 122 or portable controller 108 to execute the "wake-up" control macro on weekdays only.

Figure 10:
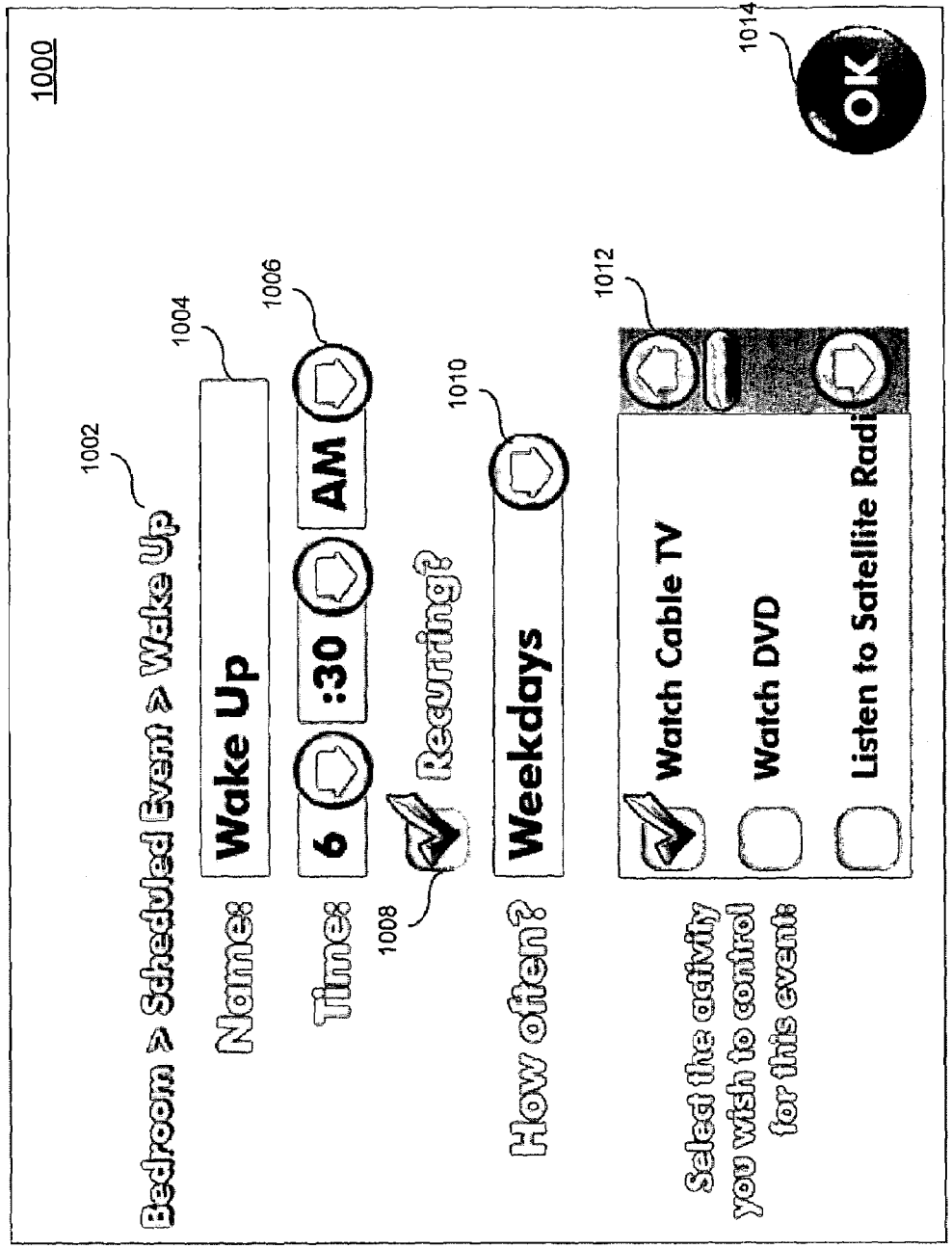
FIG. 10 illustrates a user interface for configuring a time-based control macro according to an embodiment of the present invention.

FIG. 10 illustrates a user interface 1000 for configuring a time-based control macro, according to an embodiment of the present invention. User interface 1000 includes a configuration control field 1002, a name field 1004, a time field 1006, a recurrence field 1008, a recurrence definition field 1010, a controllable activity field 1012, and an acceptance activator 1014.

The configuration control field 1002 indicates the configuration level for setting-up the time-based control macro. As shown in configuration control field 1002, a "wake-up" control macro is being scheduled to occur within the bedroom of a controlled environment, such as residential control system 100.

Name field 1004 allows the user to personalize the name of the control macro. In this example, the control macro is designated as "Wake Up."

Time field 1006 allows the user to specify the time for executing the control macro. Recurrence field 1008 specifies whether the control macro will repeat (i.e., a recurring event) or occur only once (i.e., a non-recurring event). The available selections for recurrence definition field 1010 is determined by the input at recurrence field 1008. If recurrence field 1008 specifies a recurring event, recurrence field 1010 allows the user to specify frequency of recurrence. For example, the control macro can be scheduled to repeat on a daily, bi-weekly, weekly, bi-monthly, monthly, or annual basis, or the like. The control macro can be scheduled to execute only on weekends, week-days, days having an even number, or designated holidays, birthdays, or anniversaries, or the like. In an embodiment, fields are included to enable the user to designate a specific start and/or end date for executing the control macro.

Controllable activity field 1012 allows the user to identify the specific event(s) which will occur upon execution of the control macro. For example, the user can request that television 104 be powered-on and tuned to a specific channel (shown in FIG. 10 as "Watch Cable TV"), request television 104 and DVD player (e.g., media player 116) to be powered-on to watch a designated movie (shown in FIG. 10 as "Watch DVD"), request a stereo to be powered-on and tuned to a designated frequency channel (shown in FIG. 10 as "Listen to Satellite Radio"), request the lighting 110 to be powered-on, request a wake-up alarm, or the like.

The options for each field (e.g., time field 1006, recurrence definition field 1010, controllable activity field 1012, etc.) can be pre-defined and presented in a drop-down menu, or the user can operate an input device to manually enter the desired parameters.

Acceptance activator 1014 allows the user to finalize selections and instruct central server 122 to accept the newly defined control macro. Once the fields in user interface 1000 have been properly completed, the user can operate an input device (such as, a mouse, stylus, finger, etc.) to touch acceptance activator 1014, the input from user interface 1000 would be processed by central server 122, and the next user interface, if appropriate, would be presented.

Figure 11:
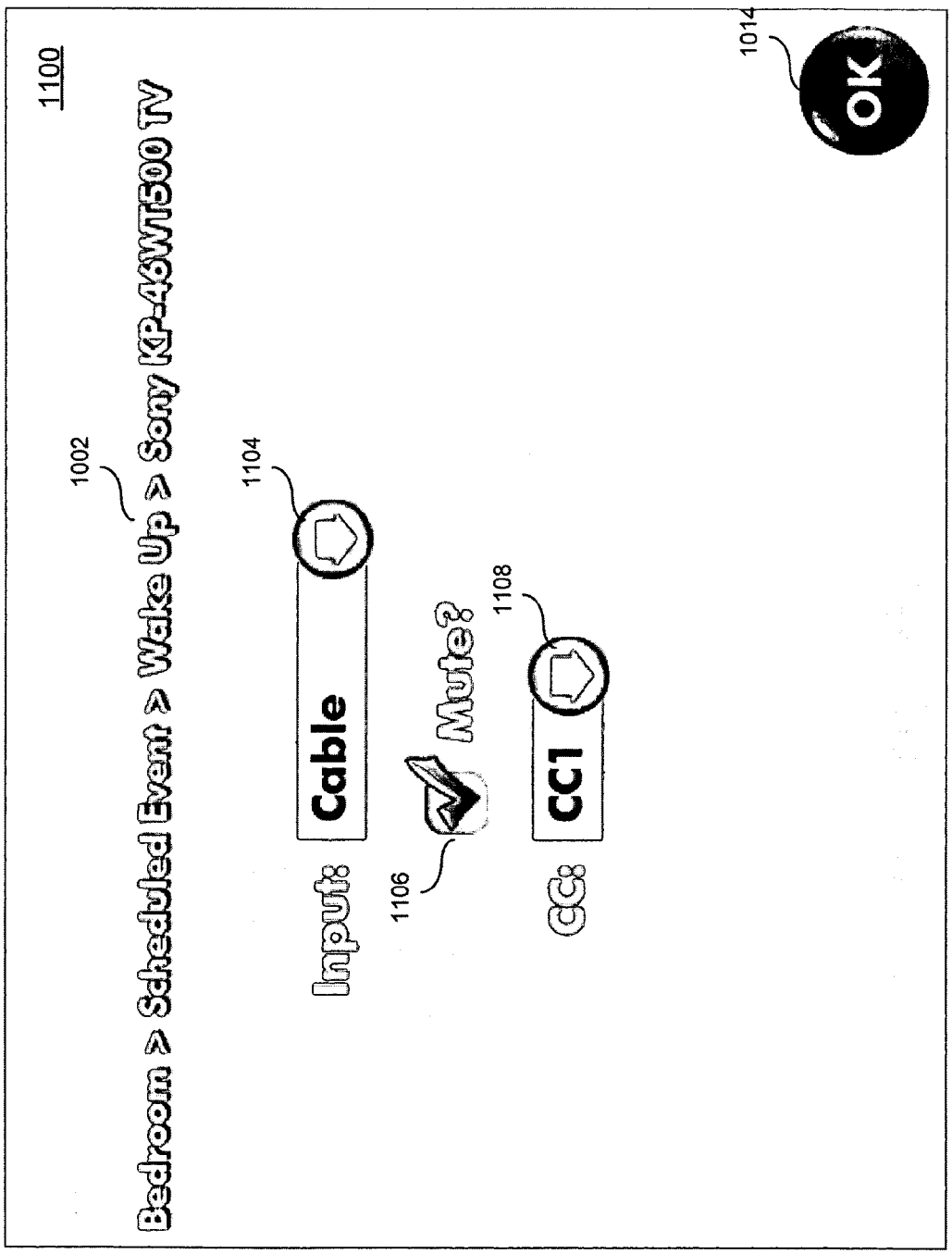
FIG. 11 illustrates a user interface for configuring a controllable system component to execute a time-based control macro, according to an embodiment of the present invention.

As shown in FIG. 10, "Watch Cable TV" is selected as the desired activity in controllable activity field 1012. Therefore, the user would need to specify the primary and affiliate system components for executing the desired activity. FIG. 11 illustrates a user interface 1100 for configuring a controllable system component to execute a time-based control macro, according to an embodiment of the present invention. As shown in configuration control field 1002, television 104 is being configured to execute a "wake-up" control macro within a bedroom of the controlled environment (e.g., residential control system 100).

User interface 1100 includes an input field 1104, an audio field 1103, and a captions field 1108. Input field 1104 allows the user to specify the input source for the scheduled television event. As shown, the user has requested input from a cable source (e.g., cable box 118). Other options include a satellite feed from DSS box 120, over-the-air broadcast from tuner 114 or an antenna coupled to television 104, media from media player 116 (e.g., PVR, VCR, DVD, etc.), or the like.

Audio field 1106 allows the user to specify an audio level. The audio level can be mute or at a predetermined decibel level.

Captions field 1108 allows the user to request text or captioning options. Upon proper completion of the fields in user interface 1100, the user can operate an input device (such as, a mouse, stylus, finger, etc.) to touch acceptance activator 1014, the input from user interface 1100 would be processed by central server 122, and the next user interface, if appropriate, would be presented.

Figure 12:
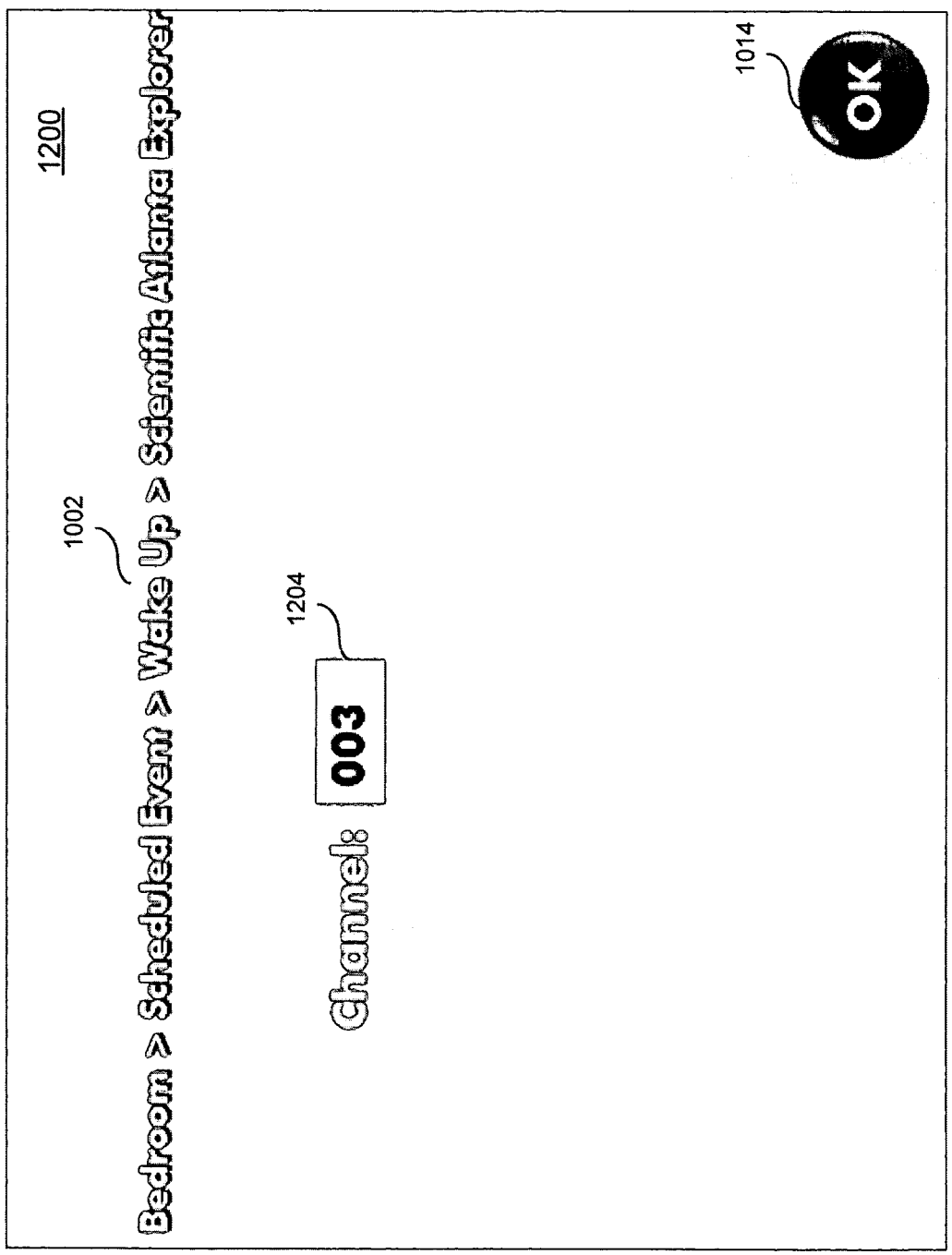
FIG. 12 illustrates a user interface for configuring an affiliate controllable system component to execute a time-based control macro, according to an embodiment of the present invention.

As shown in FIG. 11, "Cable" is selected as the desired input source for television 104. Therefore, the user would need to configure an affiliate system component to provide input to the primary system component television 104, which, in this example, would specify a cable channel for executing the desired activity. FIG. 12 illustrates a user interface 1200 for configuring an affiliate controllable system component to execute a time-based control macro, according to an embodiment of the present invention. As shown in configuration control field 1002, a cable box 118 is being configured to execute a "wake-up" control macro within a bedroom of the controlled environment (e.g., residential control system 100).

User interface 1200 includes an channel field 1204, which allows the user to specify the desired channel. Upon proper completion of channel field 1204, the user can activate acceptance activator 1014, and the input from user interface 1200 would be processed by central server 122. Additional user interfaces can be presented to enable the user to configure additional system components, as appropriate.

B. State or Event-Based Execution

In an embodiment of the present invention, a pre-defined sequence of control commands commences upon the occurrence of a particular event or the occurrence of a particular system or component state. For example, a control macro can be automatically executed when a system component (e.g., CE device) is detected to be in a particular state (e.g., the television 104 in the family room has been powered on). As described in a pending patent application entitled "Legacy Device Bridge for Residential or Non-Residential Networks" (U.S. patent application Ser. No. 10/387,590; filed Mar. 14, 2003), which is incorporated herein by reference in its entirety, the on-off state of a CE device can be determined through the use of a state detector. Such a state detector can be as simple as a light-sensitive probe that is aimed at the screen for television 104, or can be functions as a basic on/off meter. When the light-sensitive probe senses the emission of light from the television 104 screen (or, alternatively, the change from red to green light on the LED power indicator for television 104), the probe passes that information to the central server 122, which determines that television 104 is in the "on" state.

Once the server detects or determines that the family-room television 104 is in the "on" state, the server then automatically transmits the appropriate sequence of commands defining the desired control macro to the respective system component. For instance, the server 122 could be programmed to execute a "watch DVD movie" macro that includes dimming the family room lights and activating the DVD/media player 116 once the television 104 is powered on.

In another embodiment of the present invention, the occurrence of a particular detectable event (as opposed to state) can serve to prompt automatic execution of a pre-programmed macro. For example, a window (or door) can be equipped with electrical/magnetic/optical sensors that are connected to the central server 122 to inform the server 122 whether that window has been opened. Upon detection of the kitchen window being opened, the server 122 can automatically execute a "security" control macro that would turn on the lights 110 in the kitchen and/or activate the security alarm (i.e., the lights 110 and security alarm having network connectivity to the central server 122). Or, for example, in response to a doorbell being activated (which doorbell has connectivity to the central server 122), the server 122 can execute a control macro that turns on the outside lights.

The control macro of the present invention can also be triggered in response to a combination of states, events, and time. For example, the "security" macro described above can be triggered only when the kitchen window is opened (i.e., state) after 10:00 p.m. (i.e., time) on weekends (i.e., date).

Figure 6:
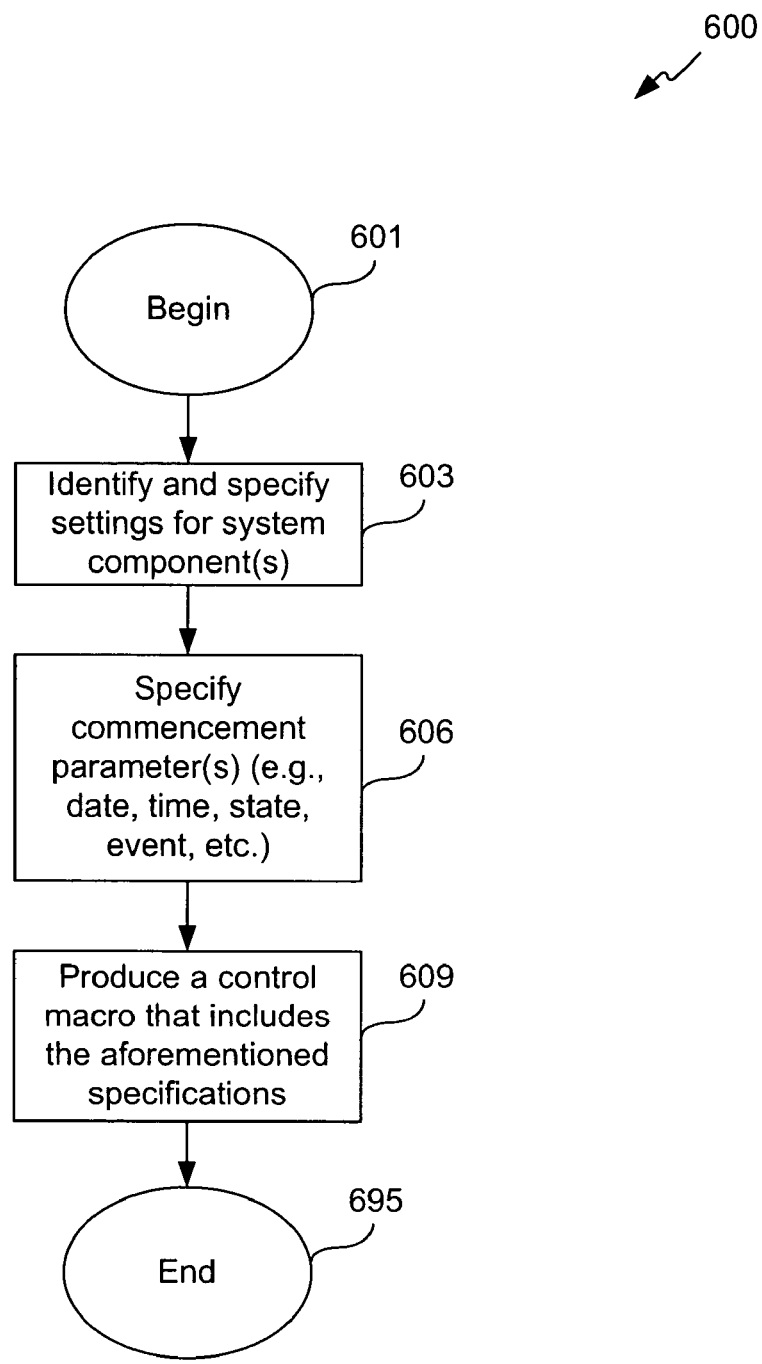
FIG. 6 illustrates defining an automatically executable control macro according to an embodiment of the present invention.

FIG. 6 provides an example for defining a control macro that is activated upon occurrence of a "commencement" parameter, such as a predefined time, date, state, event, or the like. Referring to FIG. 6, the control flow of flowchart 600 begins at step 601 when the user triggers a record-macro command.

At step 603, the user operates one of the aforementioned devices (i.e., portable controller 108, computer client 106, a user interface to server 122, or the like) to establish a control macro to identify and specify the settings for one or more system components. For example, the user can configure several audio-video devices to watch a movie as described above with reference to steps 403–418 of FIG. 4. As another example, the user can configure a bedroom light 110, television 104, and tuner 114 to create a "wake-up" control macro as discussed above. The user can also configure the operations of an alarm system, lights 110, security cameras, and monitors to define a "security" control macro as discussed above. The aforementioned examples are not intended to be exhaustive. Other types of system components and combinations of system components can be configured and associated with a control macro as discussed herein.

As discussed above, in an embodiment, a control macro can be created automatically by server 122. As such, at step 603, server 122 can setup a control macro to, for example, watch a DVD by detecting the presence of the appropriate system components within a selected room or region, either as detected from a stored room profile or detected in real time as the room profile is created.

At step 606, the user specifies a commencement parameter that, when activated, automatically enables the execution of the control macro specified at step 603. As discussed above, a commencement parameter can be a predefined time, date, state, event, or the like. The commencement parameter can also be a combination of commencement parameters.

At step 609, the control commands for executing the specifications from steps 603–606 are collectively associated with the control macro. At step 612, the control macro is given a filename and saved to a storage location. In an embodiment using a portable controller 108 and central server 122, the control macro is stored at the portable controller 108 and the associated control commands are stored at central server 122. In another embodiment, the control macro and the associated control commands are stored at server 122. In an embodiment that does not utilize a central server 122 (as discussed above), both the control macro and associated control commands are stored at the portable controller 108.

Afterwards, the control macro has been created and saved, the control macro is ready for activation upon occurrence of the commencement parameter(s), and the control flow ends as indicated at step 695.

Figure 7:
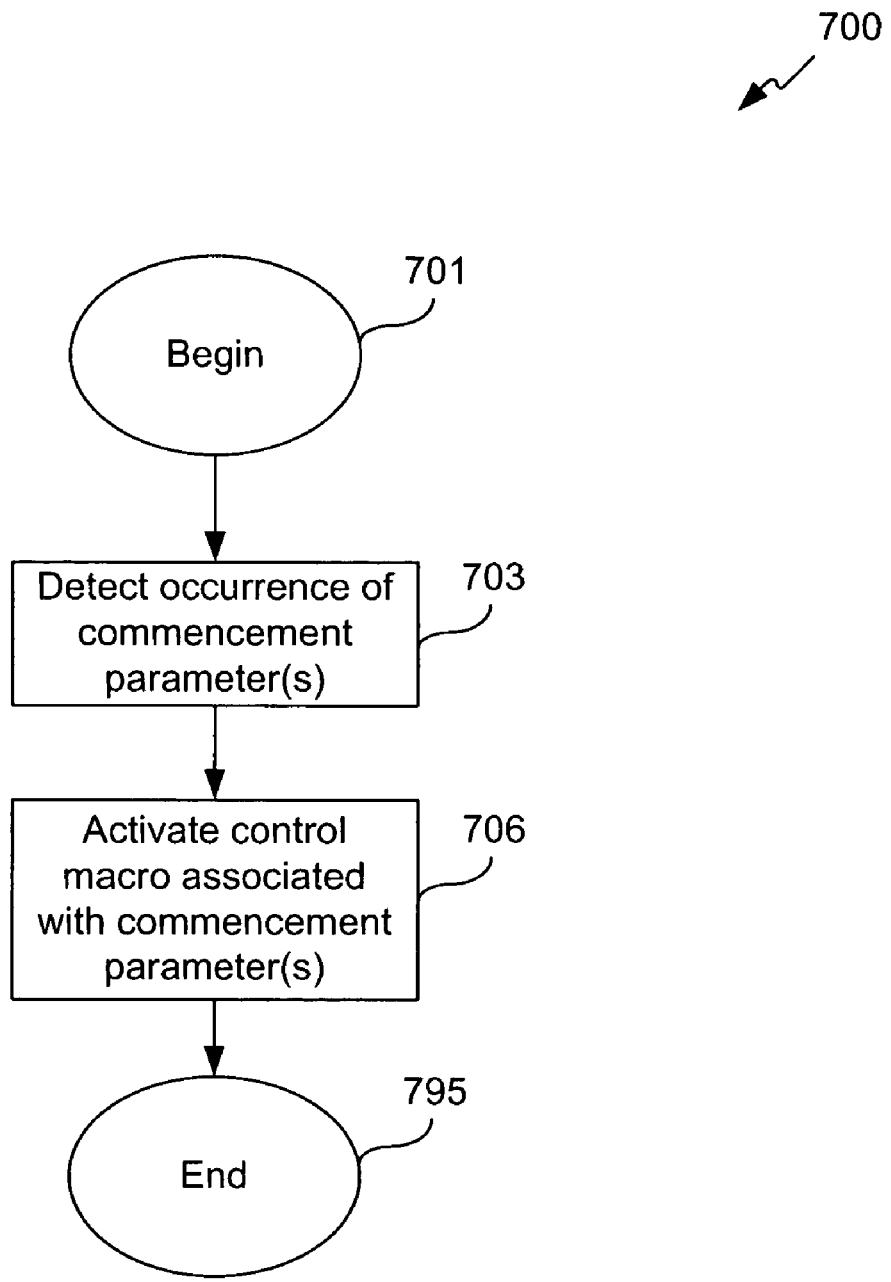
FIG. 7 illustrates activating the automatically executable control macro of FIG. 6 according to an embodiment of the present invention.

FIG. 7 illustrates an example for activating an automatically executable control macro, according to an embodiment of the present invention. Flowchart 700 show a control flow for activating the control macro of flowchart 600.

Referring to FIG. 7, the control flow of flowchart 700 begins at step 701 and passes immediately to step 703. At step 703, the occurrence of a commencement parameter is detected by portable controller 108, server 122, or some other system component in communication with either portable controller 108 or server 122. Upon detection of the occurrence of the commencement parameter, at step 706, a control macro that has been associated with the occurrence of the commencement parameter is accessed and activated.

For example, the commencement parameter can be a predefined date/time and component state. In other words, a user may setup a control macro to activate a room light if the television 104 is turned-on after 8:00 p.m. during the month of January. The commencement parameters, therefore, would be a combination of day and time (i.e., between January 1–31 after 8:00 p.m.) and component state (i.e., television being powered-on). As such, if someone turns on the television on during the month of January after 8:00 p.m., then at step 703, a state detector would signal the central server 122, as previously discussed. Thereafter, at step 706, control commands are sent to activate the room light.

In an embodiment, user roles can be established and verified prior to activating the control command, as discussed above at step 512. In other embodiments, specific regions and/or controllable system components are identified and commanded, discussed above at steps 509–521.

After the control macro has been automatically executed upon occurrence of a predefined commencement parameter, the control flow ends as indicated at step 795.

C. Context-Based Macros

As discussed above (with reference to step 509 of FIG. 5), a control macro does not need to be room specific. In fact, according to an embodiment of the present invention, a general control macro (e.g., "turn-TV-on" macro) can be automatically particularized for use in a certain context (e.g., a particular room). Unlike a control macro that is defined by a fixed, predetermined sequence of commands, a "context-based" control macro of the present invention is dynamic in the sense that the underlying commands are different and automatically generated for each context in which it is applied.

As discussed above, a "watch DVD movie" macro can be established and used to control a set of system components. Thus, a "watch DVD movie" macro that has been specifically created for the family room entertainment center (e.g., which may contain a SONY TV and PHILIPS DVD player) could not be used in a bedroom containing a different set of system components (e.g., RCA TV and SAMSUNG DVD player). Even if the user has a "universal" remote capable of controlling all the televisions and DVD players in the house, the user would still have to program different "watch DVD" macros for each room's particular set of system components.

The present invention includes methodologies and/or techniques that enable a user to program a general macro to control CE devices and other system components for universal application in the user's home (e.g., system 100). In an embodiment, when the general macro is activated, the macro is interpreted by a central server 122 (having network connectivity with the CE devices and other system components) for purposes of executing the macro in the context of the system components contained in a certain room. For example, a user could program a general "watch DVD" macro (e.g., turn on a television 104 and DVD/media player 116, and play a DVD movie) that can be used for the entire house (e.g., system 100), regardless of whether the system components vary from room to room.

As discussed above, a "location awareness" protocol enables the central server 122 and/or portable controller 108 to detect what room a user is in for purposes of allowing the portable controller 108 to control the system components in that room. Regarding the present invention, when the user activates the general "watch DVD" macro in his or her family room, the central server 122 interprets the general macro in the context of the room in which the user is currently present (e.g., in the family room). Thus, the central server 122 would issue appropriate commands (e.g., turn on the SONY TV and PHILIPS DVD player in the family room) corresponding to the general "watch DVD" macro activated in the family room. Similarly, if the user activated the same general "watch DVD" macro in his or her bedroom, the central server 122 would detect the general macro being activated in the bedroom, and send appropriate commands to the RCA TV and SAMSUNG DVD player in the user's bedroom. In this manner, the user only needs to program and maintain a single general "watch DVD" macro that can be used for different sets of system components found throughout the controlled environment.

Other examples of a context-based macro include a general "turn lights on" macro that is automatically executed in the context of the room in which it was activated. Thus, according to the present invention, if the user activated the "turn lights on" macro in the kitchen, the central server 122 would power on only the lights in the kitchen. This way, the user need not program and maintain a different "turn lights on" macro for each room of the house.

Figure 8:
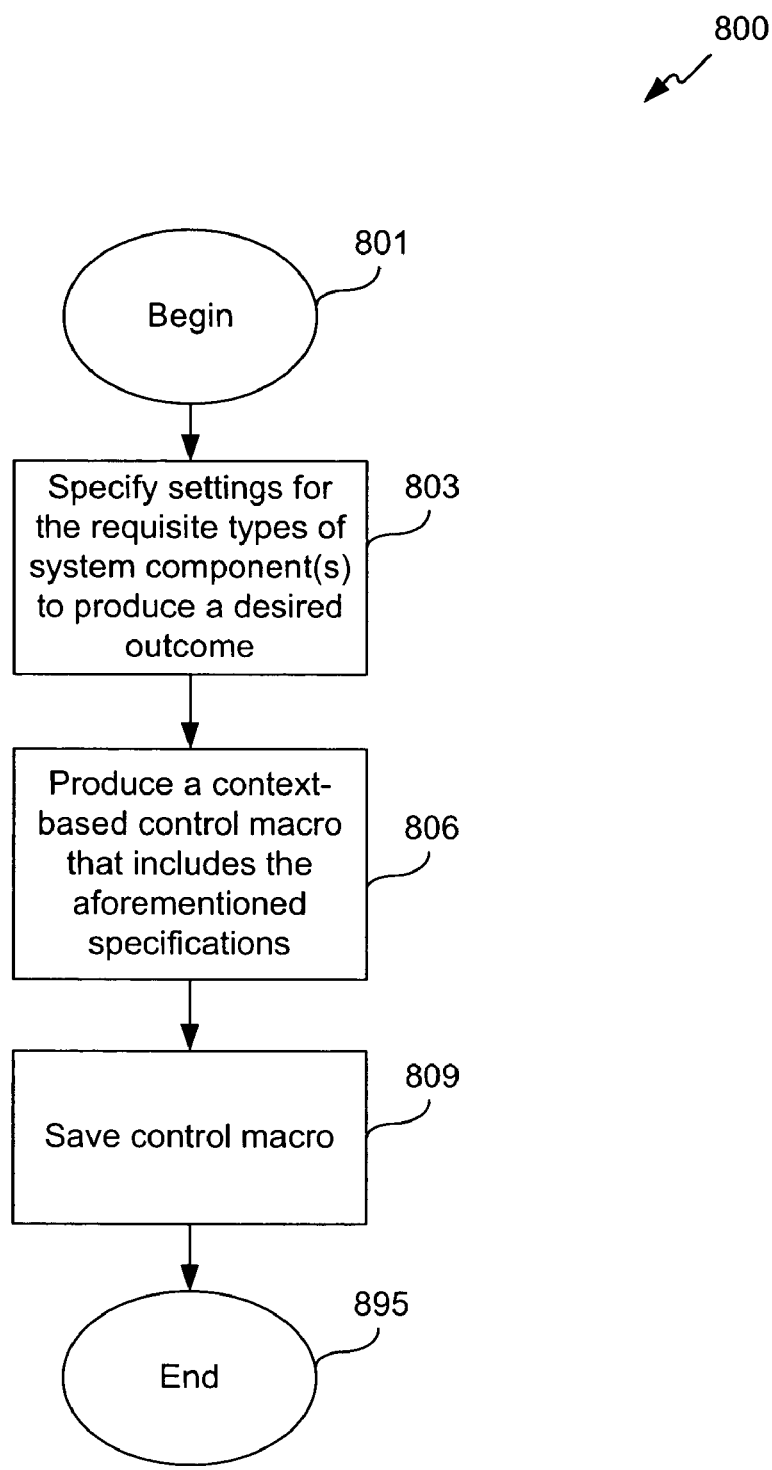
FIG. 8 illustrates defining a context-based control macro according to an embodiment of the present invention.

FIG. 8 provides an example for defining a context-based control macro according to an embodiment of the present invention. Referring to FIG. 8, the control flow of flowchart 800 begins at step 801 when the user triggers a record-macro command.

At step 803, the user operates one of the aforementioned devices (i.e., portable controller 108, computer client 106, a user interface to server 122, or the like) to establish a general control macro to control the operations and/or functions of one or more system components. However, the user does not specifically identify the system components, but rather specify the settings for a desired outcome. For example, referring to the "watch movie" example described in FIG. 4, the user would specify the "type" of system components that are needed to produce the desired outcome (i.e., watching a DVD recording) and configure the settings therefor.

In an embodiment, a screen is presented to the user that only identifies the component type, such as a television 104 without reference to a specific television 104. The user interacts with the screen to specify the desired setting for a television 104 as discussed above with reference to step 409, but the specific device (e.g., SONY television in the family room) is not identified in the control screen. The user would complete similar component-type screens to specify the desired settings of the other types of system components that are needed to produce the desired outcome. Referring back to FIG. 4, the other types of system components would be an audio client, DVD/media player 116, and lighting device 110. The settings for these types of system components are established without identifying a specific component. Depending on the desired outcome, other types of system components and combinations of system components can be configured and associated with a general control macro as discussed herein.

In an embodiment, the user can specify a commencement parameter as discussed above with reference to FIG. 6. As described above, the user can program the general control macro to automatically execute upon occurrence of one or more commencement parameters.

At step 806, the control commands for executing the specifications from step 803 are associated with the general control macro. At step 809, the general control macro is given a filename and saved to a storage location. In an embodiment using a portable controller 108 and central server 122, the general control macro is stored at the portable controller 108 and the associated control commands are stored at central server 122. In another embodiment, the general control macro and the associated control commands are stored at server 122. In an embodiment that does not utilize a central server 122 (as discussed above), both the general control macro and associated control commands are stored at the portable controller 108.

Alternatively, the context-based control macro can be created implicitly as the user defines the inter-relationship of system components by entering information through a standard system/component setup process, such as the process described in the application entitled "User Interface for Multi-Device Control," (U.S. Provisional Ser. No. 60/516, 302), which is incorporated herein by reference as though set forth in its entirety. For example, for each desired user experience (e.g., watch DVD, watch satellite TV, listen to CD, etc.), the user is requested to provide certain information, including which system components need to be activated in connection with that experience, what the settings are for each activated system component, whether each system component has inputs (e.g., receivers, amps, televisions 104), what system components are connected to those inputs, etc. From this information, a set of control scripts is generated for the particular user experience. The commands in the script are triggered by actions on the user interface for that experience. The commands in the script, in turn, invoke system component-specific commands on the system components they act on (e.g., activation of a "watch DVD" macro would invoke an "ON" command for the television 104, and DVD player (e.g., media player 116).

After the general control macro has been created and saved, the control macro is ready for activation, and the control flow ends as indicated at step 895.

Figure 9:
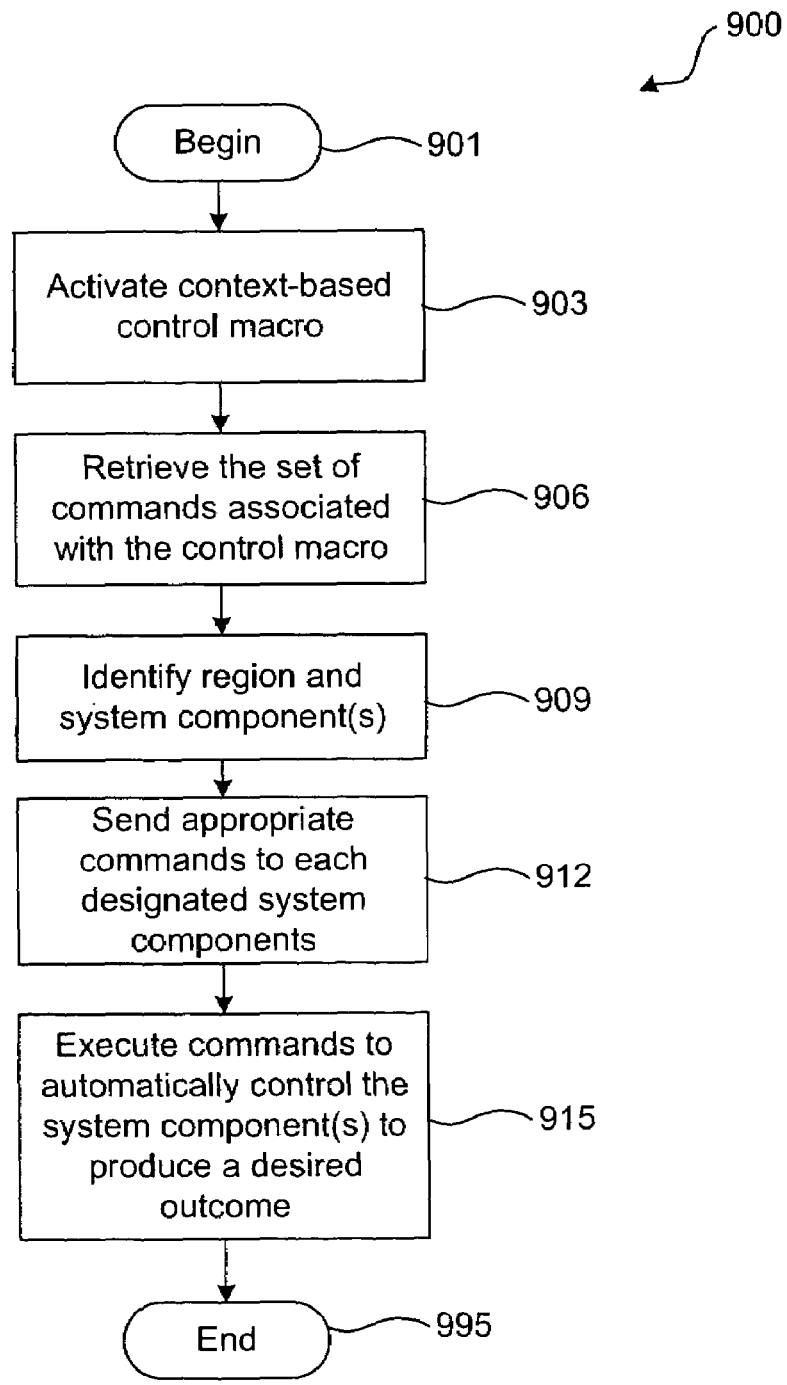
FIG. 9 illustrates activating the context-based control macro of FIG. 8 according to an embodiment of the present invention.

FIG. 9 illustrates an example for activating a context-based control macro, according to an embodiment of the present invention. Flowchart 900 shows a control flow for activating the control macro of flowchart 800.

Referring to FIG. 9, the control flow of flowchart 900 begins at step 901 and passes immediately to step 903.

At step 903, the general control macro defined in steps 801–895 is activated. The control macro can be activated by a user operating portable controller 108, or the control macro can be activated automatically upon occurrence of a commencement parameter(s), as described in FIG. 7.

Referring back to FIG. 9, at step 906, the set of commands associated with the general control macro is recalled from their storage location. The set of commands includes the user-predefined specifications for controlling the functions and/or operations of the specified type(s) of system component(s). In the "watch movie" example described in FIG. 4, the set of commands associated with a "watch movie" general control macro includes commands for altering a lighting device 110, activating a media player 116, activating a television 104, and activating an audio client, but the specific system components are not identified in the commands.

At step 909, a specific region and one or more system components (e.g., television 104 or media player 116, lighting device 110, audio client, etc.) are identified for the set of commands. As discussed above with reference to FIG. 4, the user can specify the region at the time of establishing a control macro. Also, as discussed above, the present invention includes methodologies and/or techniques for tracking the location of a user or portable controller 108. Therefore, the user can request to activate a general control macro to watch a movie in any region of the controlled environment 100 that the user is currently located. As such, server 122 would designate the user's current location as being the region for implementing the control macro. The server 122 would also retrieve a region profile for the user's current location and identify the system components (e.g., media player 116, lighting devices 110, etc.) that are located in the designated region. In an embodiment, user roles can be established and verified for each identified system component.

At step 912, the present invention determines which commands are associated with each system component identified at step 909. At step 915, each identified system component receives and executes the component-specific commands. As such, referring back to the "watch movie" example, the lighting (i.e., lighting device 110) in the specified region is automatically dimmed, the specified television 104 is turned-on and configured as predefined, and the specified DVD player (i.e., media player 116) is similarly activated. Depending on the speaker options specified in the control macro, the identified audio component is also activated and waits to receive audio feed from the DVD player. After the context-based control macro has been executed, the control flow ends as indicated at step 995.

IV. Exemplary System Implementation

FIGS. 1–12 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 13:
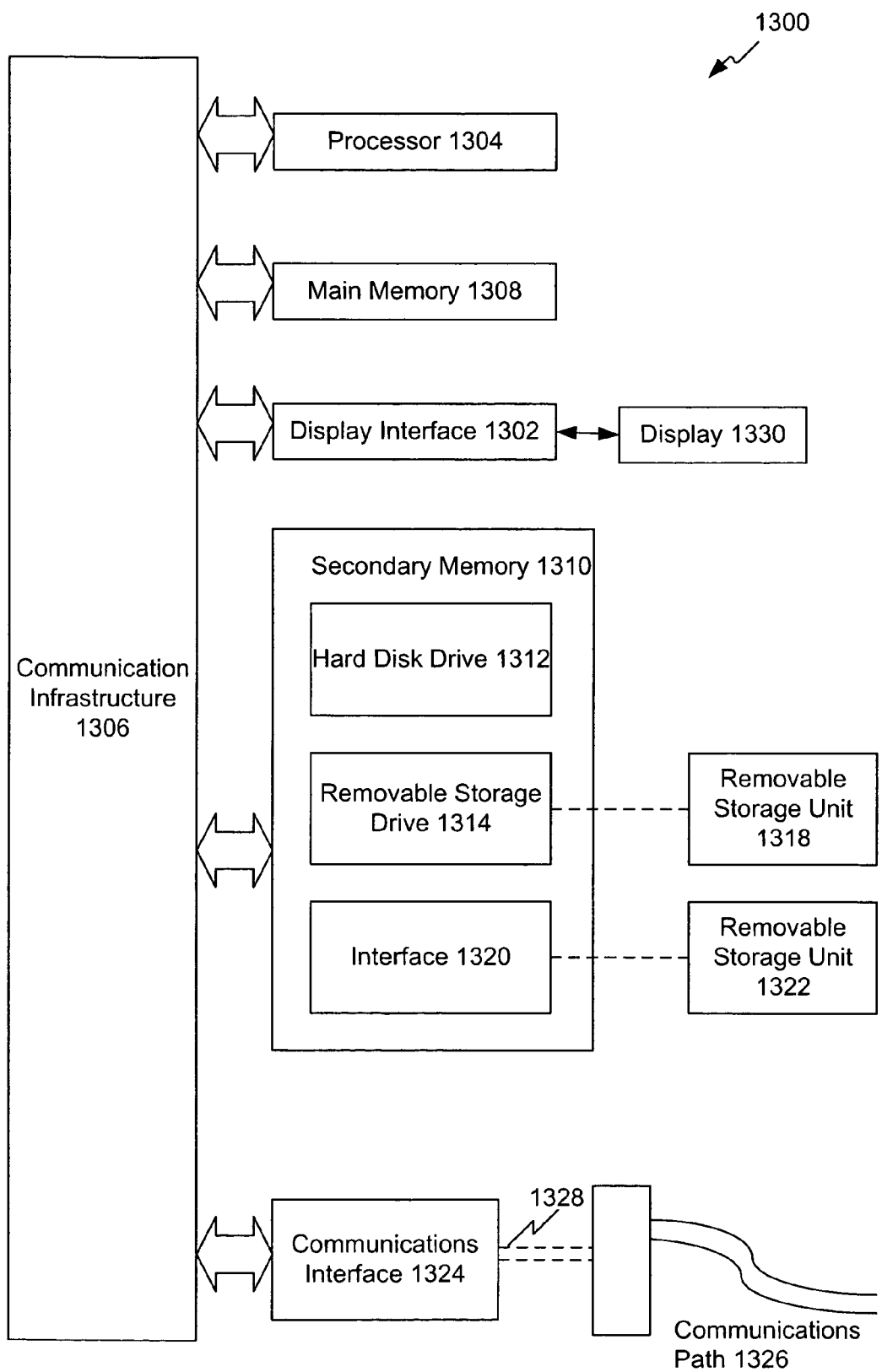
FIG. 13 is an example computer system useful for implementing the present invention.

Additionally, the present invention can be implemented in one or more computer systems or other processing systems, capable of carrying out the functionality described herein. Referring to FIG. 13, an example computer system 1000 useful in implementing the present invention is shown. Various embodiments are described in terms of this exemplary computer system 1300. After reading this description, it will become apparent to a person skilled in the relevant art(s) how to implement the invention using other computer systems and/or computer architectures.

The computer system 1300 includes one or more processors, such as processor 1304. Processor 1304 can be a special purpose or a general purpose digital signal processor. The processor 1304 is connected to a communication infrastructure 1306 (e.g., a communications bus, cross-over bar, or network).

Computer system 1300 can include a display interface 1302 that forwards graphics, text, and other data from the communication infrastructure 1306 (or from a frame buffer not shown) for display on the display unit 1330.

Computer system 1300 also includes a main memory 1308, preferably random access memory (RAM), and can also include a secondary memory 1310. The secondary memory 1310 can include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well-known manner. Removable storage unit 1318, represents a floppy disk, magnetic tape, optical disk, etc. which is read by and written to removable storage drive 1314. As will be appreciated, the removable storage unit 1318 includes a computer usable storage medium having stored therein computer software (e.g., programs or other instructions) and/or data.

In alternative embodiments, secondary memory 1310 includes other similar means for allowing software and/or data to be loaded into computer system 1300. Such means include, for example, a removable storage unit 1322 and an interface 1320. Examples of such means include a program cartridge and cartridge interface (such as that found in video game devices), a removable memory chip (such as, an EPROM or PROM) and associated socket, and other removable storage units 1322 and interfaces 1320 which allow software and data to be transferred from the removable storage unit 1322 to computer system 1300.

Computer system 1300 can also include a communications interface 1324. Communications interface 1324 allows software and/or data to be transferred between computer system 1300 and external devices. Examples of communications interface 1324 include a modem, a network interface (such as an Ethernet card), a communications port, a PCM-CIA slot and card, etc. Software and data transferred via communications interface 1324 are in the form of signals 1328 which can be electronic, electromagnetic, optical or other signals capable of being received by communications interface 1324. These signals 1328 are provided to communications interface 1324 via a communications path (i.e., channel) 1326. Communications path 1326 carries signals 1328 and can be implemented using wire or cable, fiber optics, a phone line, a cellular phone link, an RF link, free-space optics, and other communications channels.

In this document, the terms "computer program medium" and "computer usable medium" are used to generally refer to media such as removable storage unit 1318, removable storage unit 1322, a hard disk installed in hard disk drive 1312, and signals 1328. These computer program products are means for providing software to computer system 1300. The invention, in an embodiment, is directed to such computer program products.

Computer programs (also called computer control logic or computer readable program code) are stored in main memory 1308 and/or secondary memory 1310. Computer programs can also be received via communications interface 1324. Such computer programs, when executed, enable the computer system 1300 to implement the present invention as discussed herein. In particular, the computer programs, when executed, enable the processor 1304 to implement the processes of the present invention, such as the method(s) implemented using, for example, portable controller 108, server 122, and/or other system components of system 100 described above, such as methods 200, 300, 400, 500, 600, 700, 800 and/or 900, for example. Accordingly, such computer programs represent controllers of the computer system 1300.

In an embodiment where the invention is implemented using software, the software can be stored in a computer program product and loaded into computer system 1300 using removable storage drive 1314, hard drive 1312 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover as previously discussed, it should be understood that the method, system, and computer program product of the present invention should not be limited to a residential environment. The present invention can be implemented in other types of environments having a central processing system for distributing media and sending command and/or control signals to a plurality of devices and/or applications dispersed throughout a designated region. In addition to a residence, the designated region includes, but is not limited to, office complexes, suite of small offices, production studios, warehouses, entertainment arenas, health care facilities, hotels, vacation resorts, aircrafts, ships, automobiles, or the like. Thus, the present invention should not be limited by any of the above-described exemplary embodiments, but should be defined only in accordance with the following claims and their equivalents.

What is claimed is:

1. A method of managing system components within a controlled environment, comprising:
    detecting an occurrence of a commencement parameter;
    determining a region within the controlled environment;
    identifying a plurality of system components located within the region;
    accessing a sequence of component-specific commands associated with the identified system components;
    sending the sequence to the identified system components; and
    executing each component-specific command from the sequence to control a corresponding identified system component upon receipt of the component-specific command at the corresponding identified system component.

2. The method of claim 1, wherein said detecting comprises:
    detecting a day and/or time, wherein the day and/or time is specified as the commencement parameter.

3. The method of claim 1, wherein said detecting comprises:
    detecting an operating state of a system component from the plurality of system components, wherein the operating state is specified as the commencement parameter.

4. The method of claim 1, wherein said detecting comprises:
    detecting a presence of a subject within a predetermined region, wherein the detected presence is specified as the commencement parameter.

5. The method of claim 1, wherein said detecting comprises:
    detecting an altered state of a system component from the plurality of system components, wherein the altered state is specified as the commencement parameter.

6. The method of claim 1, wherein said detecting comprises:
    detecting a request to execute a generic sequence of commands for controlling an operation and/or function of one or more types of system components, wherein the generic sequence excludes identification of a particular system component, wherein the detected request is specified as the commencement parameter.

7. The method of claim 1, wherein said determining comprises:
    positioning a subject within the controlled environment to determine the region.

8. The method of claim 1, wherein said determining comprises:
    tracking and/or monitoring movement of a system component throughout the controlled environment; and
    determining the region from the current location of the moving system component.

9. The method of claim 1, wherein said determining comprises:
    determining the region from a current location of a system component from the plurality of system components.

10. The method of claim 1, wherein said determining comprises:
    determining the region from a user input, wherein the user input specifies the region.

11. The method of claim 1, wherein said identifying comprises:

polling system components within the controlled environment to identify the plurality of system components located within the region.

12. The method of claim 1, wherein said identifying comprises:
receiving a request to control a type of system component, wherein the request excludes identification of a particular system component; and
identifying the plurality of system components located within the region that matches the type of system component specified in the request.

13. The method of claim 1, wherein said accessing comprises:
accessing a generic sequence of commands for controlling an operation and/or function of one or more types of system components, wherein the generic sequence excludes identification of a particular system component; and
translating the generic sequence into the sequence of component-specific commands associated with the identified system components, wherein the identified components match the one or more types of system components.

14. The method of claim 1, further comprising:
validating permission to control each system component prior to implementing said sending step.

15. The method of claim 1, wherein said sending comprises:
sending the sequence over a wireless medium.

16. A method of managing system components within a controlled environment having a plurality of regions, comprising:
detecting an occurrence of a commencement parameter;
accessing a generic sequence of commands for controlling an operation and/or a function of one or more types of system components, wherein the generic sequence excludes identification of a particular system component;
determining a current location of a subject within the controlled environment to select a region that includes the current location;
identifying a plurality of system components located within the selected region that matches one or more types of system components specified in the generic sequence;
translating the generic sequence into a sequence of component-specific commands for controlling an operation and/or a function of the identified system components;
sending the sequence of component-specific commands to the identified system components; and
executing each component-specific command from the sequence to control a corresponding identified system component upon receipt of the component-specific command at the corresponding identified system component.

17. A method of managing system components within a controlled environment, comprising:
enabling creation of a generic sequence of commands for controlling an operation and/or a function of one or more types of system components, wherein the generic sequence excludes identification of a particular system component;
associating the sequence with an occurrence of a commencement parameter;
detecting the occurrence of the commencement parameter;
determining a region within the controlled environment;
identifying the system components located within the region that matches one or more types of system components specified in the generic sequence;
translating the generic sequence into a sequence of component-specific commands that, when executed, control an operation and/or a function of the identified system components;
sending the sequence of component-specific commands to the identified system components; and
executing each component-specific command to control a corresponding identified system component upon receipt of the component-specific command at the corresponding identified system component.

18. The method of claim 17, wherein said enabling compnses:
receiving first user input that specifies one or more types of system components;
receiving second user input that specifies an operation or a function that the one or more types of system components are configured to perform; and
processing the first user input and the second user input to create the generic sequence of commands.

19. The method of claim 18, wherein said enabling comprises:
receiving third user input that specifies a commencement parameter for initiating activation of the generic sequence of commands.

20. The method of claim 17, wherein said enabling comprises:
detecting a presence of a system component within the controlled environment;
recalling at least one predefined sequence of commands for controlling an operation and/or function of a type of system component matching the detected system component; and
creating the generic sequence of commands, wherein the detected system component is associated with the generic sequence as a candidate for being the identified system component during a subsequent execution of the identifying step.

21. The method of claim 17, wherein said detecting comprises:
detecting a day and/or time, wherein the day and/or time is specified as the commencement parameter.

22. The method of claim 17, wherein said detecting comprises:
detecting an operating state of a system component from the plurality of system components, wherein the operating state is specified as the commencement parameter.

23. A portable controller for interacting with a plurality of system components within a controlled environment, comprising;
a user interface configured to create or store a generic sequence of commands for controlling an operation and/or a function of one or more types of system components, wherein the generic sequence excludes identification of a particular system component, and wherein the generic sequence is associated with a commencement parameter;
first processing means for determining a region within the controlled environment and identifying one or more system components within the region that matches one or more types of system components specified in the generic sequence;
second processing means for translating the generic sequence into a sequence of component-specific commands that, when executed, control an operation and/or a function of the identified one or more system components; and transmitting means for sending to the identified one or more system components a component-specific command to control the operations and/or functions of a receiving system component in response to the occurrence of the commencement parameter.

24. A system for managing a plurality of system components within a controlled environment, comprising:
a control center for controlling operations and/or functions of the plurality of system components, and
a portable controller for interacting with the control center,
wherein the portable controller is operable to configure a generic sequence of commands for controlling an operation and/or a function of one or more types of system components, wherein the generic sequence excludes identification of a particular system component, and wherein the generic sequence is associated with a commencement parameter,
wherein the control center is operable to translate the generic sequence into a sequence of component-specific commands that, when executed, control one or more of the plurality of system components located within a vicinity of the portable controller as determined by input received from the portable controller, and
wherein the control center is operable to store the generic sequence of commands, and send the sequence of component-specific commands to one or more of the plurality of system components in response to an occurrence of the commencement parameter.

25. The system of claim 24, further comprising:
positioning means for tracking and/or monitoring a location or movement of the portable controller,
wherein the portable controller is operable to interact with the positioning means, and
wherein the control center is operable to send the sequence of component-specific commands to one or more of the plurality of system components located within a vicinity of the portable controller as determined by the positioning means.

26. A computer program product comprising a computer useable medium having computer readable program code functions embedded in the medium for causing a computer to manage a system of components within a controlled environment, comprising:
a first computer readable program code function that causes the computer to detect an occurrence of a commencement parameter;
a second computer readable program code function that causes the computer to access a generic sequence of commands for controlling an operation and/or a function of one or more types of system components, wherein the generic sequence excludes identification of a particular system component, and wherein the generic sequence is associated with the commencement parameter;
a third computer readable program code function that causes the computer to determine a region within the controlled environment;
a fourth computer readable program code function that causes the computer to identify one or more system components within the region that matches one or more types of system components specified in the generic sequence; and
a fifth computer readable program code function that causes the computer to translate the generic sequence into a sequence of component-specific commands that, when executed, control an operation and/or a function of the identified one or more system components.

27. The computer program product according to claim 26, wherein the first computer readable program code function comprises:
computer readable program code that causes the computer to detect a day and/or time, wherein the day and/or time is specified as the commencement parameter.

28. The computer program product according to claim 26, wherein the first computer readable program code function comprises:
computer readable program code that causes the computer to detect an operating state of a system component from the plurality of system components, wherein the operating state is specified as the commencement parameter.

* * * * *